(12) United States Patent
Wu et al.

(10) Patent No.: US 9,836,832 B2
(45) Date of Patent: Dec. 5, 2017

(54) METHOD AND DEVICE FOR EVALUATING QUALITY OF VIDEO IN TIME DOMAIN ON TERMINAL SIDE

(71) Applicant: XI'AN ZHONGXING NEW SOFTWARE CO. LTD., Xi'an (CN)

(72) Inventors: Baochun Wu, Shenzhen (CN); Fang Wei, Shenzhen (CN); Jiaqi Xu, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 279 days.

(21) Appl. No.: 14/762,901

(22) PCT Filed: Sep. 17, 2013

(86) PCT No.: PCT/CN2013/083650
§ 371 (c)(1),
(2) Date: Jul. 23, 2015

(87) PCT Pub. No.: WO2014/114098
PCT Pub. Date: Jul. 31, 2014

(65) Prior Publication Data
US 2015/0348251 A1    Dec. 3, 2015

(30) Foreign Application Priority Data
Jan. 23, 2013   (CN) .......................... 2013 1 0024251

(51) Int. Cl.
*G06T 7/254* (2017.01)
*G06T 7/32* (2017.01)
*G06T 7/00* (2017.01)

(52) U.S. Cl.
CPC ............ *G06T 7/0002* (2013.01); *G06T 7/254* (2017.01); *G06T 7/32* (2017.01);
(Continued)

(58) Field of Classification Search
CPC    G06T 7/002; G06T 7/254; G06T 7/32; G06T 2207/10016; G06T 2207/10024; G06T 2207/20016; G06T 2207/30168
(Continued)

(56) References Cited

U.S. PATENT DOCUMENTS 9,319,671 B2 *   4/2016   Han ...................... H04N 17/004
9,578,337 B2 *   2/2017   Yamada ............... H04N 17/004
(Continued)

FOREIGN PATENT DOCUMENTS

CN           1809175 A       7/2006
CN         102421007 A       4/2012
(Continued)

OTHER PUBLICATIONS

International Search Report for corresponding application PCT/CN2013/083650 filed Sep. 17, 2013; dated Mar. 20, 2014.

*Primary Examiner* — William C Vaughn, Jr.
*Assistant Examiner* — Jae N Noh
(74) *Attorney, Agent, or Firm* — Cantor Colburn LLP

(57) ABSTRACT

Disclosed are a method and device for valuating quality of a video in a time domain on a terminal side. The method comprises that: a significant movement area proportion of each video frame is calculated, video frames are divided into absolute regular frames and suspected distorted frames according to the significant movement area proportion of each video frame; a frozen frame detection, a scenario-conversion frame detection, a jitter frame detection, and a ghosting frame detection are performed on the suspected distorted frames; the video is split into scenarios according to the result of the scenario-conversion frame detection, scenario information weight of each scenario is calculated, and the quality of the video in time domain on the terminal side is determined. The disclosure increases the closeness of
(Continued)

the evaluation result to subjective perception, expands an evaluation system of time domain distortions of the video, and reduces the probability of misjudgments.

20 Claims, 6 Drawing Sheets

(52) U.S. Cl.
CPC ............... *G06T 2207/10016* (2013.01); *G06T 2207/10024* (2013.01); *G06T 2207/20016* (2013.01); *G06T 2207/30168* (2013.01)

(58) Field of Classification Search
USPC .................................................... 375/240.11
See application file for complete search history.

(56) References Cited

U.S. PATENT DOCUMENTS

| | | | |
|---|---|---|---|
| 2010/0053336 A1* | 3/2010 | Bourret | ................ H04N 17/004 348/180 |
| 2015/0281709 A1* | 10/2015 | Bracha | .................. H04N 19/36 375/240.26 |

FOREIGN PATENT DOCUMENTS

| | | | |
|---|---|---|---|
| WO | 2005060272 A1 | 6/2005 | |
| WO | 2012000136 A1 | 1/2012 | |

* cited by examiner

METHOD AND DEVICE FOR EVALUATING QUALITY OF VIDEO IN TIME DOMAIN ON TERMINAL SIDE

TECHNICAL FIELD

The disclosure relates to the technical field of the evaluations on the objective quality of the video, including e.g., a method and device for evaluating quality of video in time domain on the terminal side.

BACKGROUND

In the related art, the evaluation on the objective quality of a video can respectively be realized on a network side and on a terminal side, wherein the evaluation on the terminal side is performed after a user terminal decodes the video. Although the evaluation on the terminal side is not so good as the evaluation on the network side on the efficiency and the feedback capability, it performs the evaluation on the video finally viewed by a user, which can sufficiently embody the impact on the video quality from a service to a network, finally to the reception on the terminal and video decoding, and can better reflect the subjective perception of the user on the video service.

The quality of the video in time domain refers to a quality factor only existing between video frames, that is to say, the impact of a whole-frame loss on the video. At present, there have been a large amount of mature research production on the quality of the video in spatial domain; however, relevant methods for evaluating the quality of the video in time domain are relatively few.

At present, the evaluation on the objective quality of the video in the time domain still mainly stay in a full reference evaluations, whether phenomenons such as frame repetition and frame jitter occur is distinguished by aligning a tested video with an original video frame by frame; however, this method completely unable to adapt to the current video service, for example, the streaming media and video session with the characteristics of timeliness and non-traceability. The evaluation on the objective quality of these video services need to be realized by means of no-reference, that is, the real-time video is evaluated only by using relevant characteristics of the tested video rather than considering the original video. Although the no-reference evaluation would reduce a certain accuracy with respect to the full-reference evaluation, it can well complete the requirements of the timeless, and does not need to acquire the original video simultaneously.

Nowadays, the existing no-reference methods for evaluating the quality of the video in the time domain on the terminal side are relatively few, which are mainly realized by calculating a difference between frames, comprising the method such as a method for calculating a luminance difference between frames and a method for calculating a mean square error, and judging whether the result is that a frame is lost by comparing the calculated difference with a threshold. In these methods, a larger error is often brought, the impact of the video motility on the quality in the time domain is not considered, and the distinction degree on scenario-conversion frames is very low, and a quality index of the time domain "freeze" is only considered.

SUMMARY

A method and device for evaluating quality of video in time domain on the terminal side are provided in the embodiment of the disclosure, so as to solve the problems for the no-reference technology in time domain on the terminal side in the related art that the evaluation error is big, the movements is overlooked, and the indicator is single.

According to an aspect of the embodiment, a method for evaluating quality of a video in a time domain on a terminal side, comprising: calculating a significant movement area proportion of each video frame, wherein the significant movement area proportion refers to a proportion of an area on which a significant change occurs between two adjacent video frames to a video frame area; dividing video frames into absolute regular frames and suspected distorted frames according to the significant movement area proportion of each video frame; performing a frozen frame detection, a scenario-conversion frame detection, a jitter frame detection, and a ghosting frame detection on the suspected distorted frames; and splitting the video into scenarios according to a result of the scenario-conversion frame detection, calculating scenario information weight of each scenario, calculating a distortion coefficient according to a result of the frozen frame detection, a result of the jitter frame detection, and a result of the ghosting frame detection, and determining the quality of the video in the time domain on the terminal side according to the significant movement area proportion, the scenario information weight, and the distortion coefficient.

In an example embodiment, calculating the significant movement area proportion of each video frame comprises: step 11, according to a playing progress, decoding a current $k^{th}$ video frame to a luminance chrominance YUV space to obtain a luminance matrix $Y_k$; step 12, when it is determined that the current $k^{th}$ video frame is the first frame of the video, setting a previous frame of the current $k^{th}$ video frame to be a frame of which pixel values are all zero, and executing step 13; when it is determined that the current $k^{th}$ video frame is not the first frame of the video, directly executing step 13; step 13, performing Gaussian filtering on the luminance matrix $Y_k$ of the current $k^{th}$ video frame, and performing down-sampling on a filtering result; step 14, repeatedly executing step 13 n−1 times to obtain a Gaussian image pyramid $PMD_k$ containing n matrices with different scales, wherein a scale represents the number of times of Gaussian filtering and down-sampling operations that have been performed on a current matrix, and when the scale is 1, the current matrix is a source matrix $Y_k$, and n is a total number of the scales; step 15, for a Gaussian image pyramid $PMD_k$ of the current $k^{th}$ video frame and a $PMD_{k-1}$ of a $(k-1)^{th}$ video frame, calculating absolute value of difference of each element between matrices in scale s to obtain a difference matrix $M_{k,s}$, and constituting a difference pyramid $DPMD_k$ according to the difference matrix in each scale, wherein $M_{1,s}$ in the difference matrix $M_{k,s}$ is an all-zero matrix; step 16, performing bilinear interpolation on the difference matrixes in all the scales except scale 1 in the $DPMD_k$, normalizing a size of the difference matrix to be the same as a size of source matrix $Y_k$, and averaging n difference matrices of the $DPMD_k$ including the source matrix $Y_k$ therein after interpolation to obtain a normalized difference matrix $Z_k$; step 17, performing median filtering and noise reduction on the $Z_k$ to obtain $Z_{km}$, and setting a threshold θ, assigning 1 to elements in the $Z_{km}$ which are greater than or equal to θ and assigning 0 to elements in the $Z_{km}$ which are less than θ to obtain a binary matrix $BI_k$; and step 18, summing the $BI_k$ and then dividing the sum by a frame pixel area of the current $k^{th}$ video frame to obtain the significant movement area proportion of the current $k^{th}$ video frame.

In an example embodiment, step 13 comprises: performing Gaussian filtering on the luminance matrix $Y_k$ of the current $k^{th}$ frame with a frame window being 3×3, a mean value being 0 and a standard deviation being 0.5, and performing $1/4^a$ down-sampling on a filtering result, where a is a natural number.

In an example embodiment, dividing the video frames into the absolute regular frames and the suspected distorted frames according to the significant movement area proportion of each video frame comprises: step 21, when a significant movement area proportion of a current $k^{th}$ video frame is 0, determining that the current $k^{th}$ video frame is a suspected frozen frame, where k>1; step 22, when the significant movement area proportion of the current $k^{th}$ video frame is more than twice the significant movement area proportion of a previous video frame of the current $k^{th}$ video frame and is greater than a first predetermined threshold, and the previous video frame of the current $k^{th}$ video frame is a non-frozen frame, determining that the current $k^{th}$ video frame is a suspected scenario-conversion frame; step 23, when the significant movement area proportion of the current $k^{th}$ video frame is equal to a significant movement area proportion of a $(k+1)^{th}$ video frame, determining that the current $k^{th}$ video frame and the $(k+1)^{th}$ video frame are suspected jitter frames or suspected ghosting frames; and step 24, when the significant movement area proportion of the current $k^{th}$ video frame does not conform to cases in step 21 to step 23, and the previous video frame of the current $k^{th}$ video frame is the non-frozen frame, determining that the current $k^{th}$ video frame is the absolute regular frame.

In an example embodiment, performing the frozen frame detection on the suspected distorted frames comprises: step 31, summing all elements in a difference matrix $M_{k,1}$ with the scale being 1, when a summing result is 0, executing step 32; when the summing result is not 0, determining that the current $k^{th}$ video frame is a normal frame and exiting a entire distortion detection of the current $k^{th}$ video frame; step 32, when it is judged that a $(k-1)^{th}$ video frame is a frozen frame, determining that the current $k^{th}$ video frame is also the frozen frame and exiting the entire distortion detection of the current $k^{th}$ video frame; when it is judged that the $(k-1)^{th}$ video frame is not the frozen frame, executing step 33; step 33, when it is judged that the $(k-1)^{th}$ video frame is a screen frame, determining that the current $k^{th}$ video frame is also the screen frame and exiting the entire distortion detection of the current $k^{th}$ video frame; when it is judged that the $(k-1)^{th}$ video frame is not the screen frame, executing step 34; step 34, calculating a space complexity $O_s$ and a colour complexity $O_c$ of the current $k^{th}$ video frame; and step 35, calculating a screen coefficient $P=1-0.6O_s-0.4O_c+0.2b$ of the current $k^{th}$ video frame, when the P is greater than or equal to the second threshold, determining that the current $k^{th}$ video frame is the screen frame and is not the frozen frame; when the P is not greater than or equal to the second threshold, determining that the current $k^{th}$ video frame is the frozen frame, where b is a binary parameter, and when the $(k-1)^{th}$ video frame is a scenario-conversion frame or a significant movement area proportion of the $(k-1)^{th}$ video frame and a significant movement area proportion of a $(k-2)^{th}$ video frame are non-zero and equal, b=1; when the $(k-1)^{th}$ video frame is not the scenario-conversion frame and/or the significant movement area proportion of the $(k-1)^{th}$ video frame and the significant movement area proportion of the $(k-2)^{th}$ video frame are zero or not equal, b=0.

In an example embodiment, performing the scenario-conversion frame detection on the suspected distorted frames comprises: step 41, dividing a prospect matrix region $BI_{k,f}$ from a middle region of a binary matrix $BI_k$ with a width being w and a height being h and determining other region of the $BI_k$ as a background region $BI_{k,b}$, and calculating a ratio $R_k$ of a sum of elements in the $BI_{k,b}$ of the $BI_k$ to a sum of elements in the $BI_{k,f}$ of the $BI_k$, wherein a height of the $BI_{k,f}$ is $\lfloor h/8+1 \rfloor^{th}$ row to $\lfloor 7h/8 \rfloor^{th}$ row of the $BI_k$, and a width of the $BI_{k,f}$ is $\lfloor w/8+1 \rfloor^{th}$ column to $\lfloor 7w/8 \rfloor^{th}$ column of the $BI_k$, a symbol "$\lfloor \ \rfloor$" refers to round down; step 42, dividing the region $BI_{k,b}$ into four parts by taking a $[h/2]^{th}$ row and a $[h/2]^{th}$ column of the $BI_k$ as a boundary, and respectively calculating proportion of the number of elements with value being 1 to the number of all elements in each of the four parts, and counting the number $N_{iv}$ of proportions which are greater than or equal to a third predetermined threshold in the four proportions; and step 43, when $R_k$ is greater than or equal to a fourth predetermined threshold and $N_{iv}$ is greater than or equal to a fifth predetermined threshold, determining that the current $k^{th}$ video frame is a scenario-conversion frame; when $R_k$ is not greater than or equal to the fourth predetermined threshold and/or $N_{iv}$ is not greater than or equal to the fifth predetermined threshold, exiting the scenario-conversion frame detection on the current $k^{th}$ video frame.

In an example embodiment, performing the jitter frame detection and the ghosting frame detection on the suspected distorted frames comprises: step 51, when a $(k-1)^{th}$ video frame is a gradient frame, determining that the current $k^{th}$ video frame is also the gradient frame and exiting a entire distortion detection of the current $k^{th}$ video frame; when the $(k-1)^{th}$ video frame is not the gradient frame, executing step 52; step 52, when a significant movement area proportion of a current $k^{th}$ video frame is equal to a significant movement area proportion of the $(k-1)^{th}$ video frame, determining that the current $k^{th}$ video frame is the gradient frame and exiting the entire distortion detection of the current $k^{th}$ video frame; when the significant movement area proportion of the current $k^{th}$ video frame is not equal to the significant movement area proportion of the $(k-1)^{th}$ video frame, executing step 53; step 53, calculating a differential matrix between a luminance matrix of the $(k-1)^{th}$ video frame and a luminance matrix of a $(k+1)^{th}$ video frame, taking absolute values of all elements of the differential matrix and then summing all the elements; when a sum is 0, determining that the $(k+1)^{th}$ video frame is a jitter frame, and the $k^{th}$ frame is a normal frame, exiting the entire distortion detection of the current $k^{th}$ video frame and executing step 54; when the sum is not 0, executing step 54; and step 54, when the significant movement area proportion of the current $k^{th}$ video frame is greater than or equal to the sixth predetermined threshold, determining that the current $k^{th}$ video frame is a ghosting frame, and the $(k+1)^{th}$ video frame is the normal frame; when the significant movement area proportion of the current $k^{th}$ video frame is not greater than or equal to a sixth predetermined threshold, determining that the $k^{th}$ video frame is the normal frame.

In an example embodiment, splitting the video into scenarios according to the result of the scenario-conversion frame detection and calculating scenario information weight of each scenario comprise: splitting the video into scenarios according to the result of the scenario-conversion frame detection, when a current $k^{th}$ video frame is the first absolute regular frame after a closest scenario-conversion frame, summing a space complexity, a colour complexity, a luminance mean value and a significant movement area proportion of the current $k^{th}$ video frame to obtain a scenario information weight used for weighting the scenario.

In an example embodiment, calculating the distortion coefficient according to the result of the frozen frame detection, the result of the jitter frame detection, and the result of the ghosting frame detection comprises: calculating the distortion coefficient K according to formula 1;

$$K=0.07\ln(44P_{frz}-41.28)\times F_{frz}+0.29F_{jit}+0.19F_{gst} \quad \text{formula 1;}$$

where $F_{frz}$, $F_{jit}$ and $F_{gst}$ are respectively flag bits of a frozen frame, a jitter frame and a ghosting frame of a current frame, and one and only one of the three flag bits is 1, and other flag bits are all 0, 1 representing that there is a corresponding type of distortion in an evaluated video frame, and 0 representing that there is no corresponding type of distortion in the evaluated video frame; $P_{frz}$ is a freeze sustainability coefficient, and $P_{frz}=n\times\log_2(2+t)$, where n is the number of continuous frames accumulated in this freeze, and t is the number of times of freezes of which duration is longer than the second predetermined time at a single time within a first predetermined time before this freeze occurs, wherein the second predetermined time is less than the first determined time.

In an example embodiment, determining the quality of the video in time domain on the terminal side according to the significant movement area proportion, the scenario information weight, and the distortion coefficient comprises: calculating the quality Q of the video in the time domain on the terminal side according to formula 2; $Q=1-m\sqrt{A_q}\times Expr\times K$ formula 2; where m is an expansion coefficient, $A_q$ is a significant movement area proportion of a previous normal frame of a video frame on which the distortion occurs, Expr is a scenario information weight, and K is a distortion coefficient.

According to another aspect of the embodiment, a device for evaluating quality of a video in a time domain on a terminal side, comprising: a calculating component, configured to calculate a significant movement area proportion of each video frame, wherein the significant movement area proportion refers to a proportion of an area on which a significant change occurs between two adjacent video frames to a video frame area; a dividing component, configured to divide video frames into absolute regular frames and suspected distorted frames according to the significant movement area proportion of each video frame; a detecting component, configured to perform a frozen frame detection, a scenario-conversion frame detection, a jitter frame detection, and a ghosting frame detection on the suspected distorted frames; and an evaluating component, configured to split the video into scenarios according to a result of the scenario-conversion frame detection, calculate scenario information weight of each scenario, calculate a distortion coefficient according to a result of the frozen frame detection, a result of the jitter frame detection, and a result of the ghosting frame detection, and determine the quality of the video in the time domain on the terminal side according to the significant movement area proportion, the scenario information weight, and the distortion coefficient.

In an example embodiment, the calculating component comprises: a luminance matrix acquiring sub-component, configured to, according to a playing progress, decode a current $k^{th}$ video frame to a luminance chrominance YUV space to obtain a luminance matrix $Y_k$; a setting sub-component, configured to, when it is determined that the current $k^{th}$ video frame is the first frame of the video, set a previous frame of the current $k^{th}$ video frame to be a frame of which pixel values are all zero, and invoke a filter sampling sub-component; when it is determined that the current $k^{th}$ video frame is not the first frame of the video, directly invoke the filter sampling sub-component; the filter sampling sub-component, configured to perform Gaussian filtering on the luminance matrix $Y_k$ of the current $k^{th}$ video frame, and perform down-sampling on a filtering result; a Gaussian image pyramid acquiring sub-component, configured to repeatedly invoke the Gaussian image pyramid acquiring sub-component n−1 times to obtain a Gaussian image pyramid $PMD_k$ containing n matrices with different scales, wherein a scale represents the number of times of Gaussian filtering and down-sampling operations that have been performed on a current matrix, and when the scale is 1, the current matrix is a source matrix $Y_k$, and n is a total number of the scales; a Difference pyramid acquiring sub-component, configured to, for a Gaussian image pyramid $PMD_k$ of the current $k^{th}$ video frame and a $PMD_{k-}1$ of a $(k-1)^{th}$ video frame, calculate absolute value of difference of each element between matrices in scale s to obtain a difference matrix $M_{k,s}$, and constitute a difference pyramid $DPMD_k$ according to the difference matrix in each scale, wherein $M_{1,s}$ in the difference matrix $M_{k,s}$ is an all-zero matrix; a Normalized difference matrix acquiring sub-component, configured to perform bilinear interpolation on the difference matrixes in all the scales except scale 1 in the $DPMD_k$, normalize a size of the difference matrix to be the same as a size of the source matrix $Y_k$, and average n difference matrices of the $DPMD_k$ including the source matrix $Y_k$ therein after interpolation to obtain a normalized difference matrix $Z_k$; a Binary matrix acquiring sub-component, configured to perform median filtering and noise reduction on the $Z_k$ to obtain $Z_{km}$, and set a threshold θ, assign 1 to elements in the $Z_{km}$ which are greater than or equal to θ and assign 0 to elements in the $Z_{km}$ which are less than θ to obtain a binary matrix $BI_k$; and a Significant movement area proportion acquiring sub-component, configured to sum the $BI_k$ and then divide the sum by a frame pixel area of the current $k^{th}$ video frame to obtain the significant movement area proportion of the current $k^{th}$ video frame.

In an example embodiment, the filter sampling sub-component is configured to perform Gaussian filtering on the luminance matrix $Y_k$ of the current $k^{th}$ frame with a frame window being 3×3, a mean value being 0 and a standard deviation being 0.5, and perform $\frac{1}{4}^a$ down-sampling on a filtering result, where a is a natural number.

In an example embodiment, the dividing component comprises: a suspected frozen frame determining sub-component, configured to, when a significant movement area proportion of a current $k^{th}$ video frame is 0, determine that the current $k^{th}$ video frame is a suspected frozen frame, where k>1; a suspected scenario-conversion frame determining sub-component, configured to, when the significant movement area proportion of the current $k^{th}$ video frame is more than twice the significant movement area proportion of a previous video frame of the current $k^{th}$ video frame and is greater than a first predetermined threshold, and the previous video frame of the current $k^{th}$ video frame is a non-frozen frame, determine that the current $k^{th}$ video frame is a suspected scenario-conversion frame; a Suspected jitter frame and suspected ghosting frame determining sub-component, configured to, when the significant movement area proportion of the current $k^{th}$ video frame is equal to a significant movement area proportion of a $(k+1)^{th}$ video frame, determine that the current $k^{th}$ video frame and the $(k+1)^{th}$ video frame are suspected jitter frames or suspected ghosting frames; and an Absolute regular frame determining sub-component, configured to, when the significant movement area proportion of the current $k^{th}$ video frame does not conform to above various sub-components, and the previous video frame of the current $k^{th}$ video frame is the non-frozen frame, determine that the current $k^{th}$ video frame is the absolute regular frame.

In an example embodiment, the detecting component comprises: a frozen frame detecting component, wherein the frozen frame detecting component comprises: a summing sub-component, configured to sum all elements in a difference matrix $M_{k,1}$ with the scale being 1, and when a summing result is 0, invoke a First judging sub-component; and when the summing result is not 0, determine that the current $k^{th}$ video frame is a normal frame and exit a entire distortion detection of the current $k^{th}$ video frame; the First judging sub-component, configured to, when it is judged that a $(k-1)^{th}$ video frame is a frozen frame, determine that the current $k^{th}$ video frame is also the frozen frame and exit the entire distortion detection of the current $k^{th}$ video frame; when it is judged that the $(k-1)^{th}$ video frame is not the frozen frame, invoke a Screen frame judging sub-component; the Screen frame judging sub-component, configured to, when it is judged that the $(k-1)^{th}$ video frame is a screen frame, determine that the current $k^{th}$ video frame is also the screen frame and exit the entire distortion detection of the current $k^{th}$ video frame; when it is judged that the $(k-1)^{th}$ video frame is not the screen frame, invoke a Calculating sub-component; the Calculating sub-component, configured to calculate a space complexity $O_s$ and a colour complexity $O_c$ of the current $k^{th}$ video frame; and a frozen frame and screen frame distinguishing sub-component, configured to calculate a screen coefficient $P=1-0.6O_s-0.4O_c+0.2b$ of the current $k^{th}$ video frame, when the P is greater than or equal to the second threshold, determine that the current $k^{th}$ video frame is the screen frame and is not the frozen frame; when the P is not greater than or equal to a second threshold, determine that the current $k^{th}$ video frame is the frozen frame, where b is a binary parameter, and when the $(k-1)^{th}$ video frame is a scenario-conversion frame or a significant movement area proportion of the $(k-1)^{th}$ video frame and a significant movement area proportion of a $(k-2)^{th}$ video frame are non-zero and equal, b=1; when the $(k-1)^{th}$ video frame is not the scenario-conversion frame and/or the significant movement area proportion of the $(k-1)^{th}$ video frame and the significant movement area proportion of the $(k-2)^{th}$ video frame are zero or not equal, b=0.

In an example embodiment, the detecting component comprises: a scenario-conversion frame detecting component, wherein the scenario-conversion frame detecting component comprises: a Prospect matrix region dividing sub-component, configured to divide a prospect matrix region $BI_{k,f}$ from a middle region of a binary matrix $BI_k$ with a width being w and a height being h and determine other region of the $BI_k$ as a background region $BI_{k,b}$, and calculate a ratio $R_k$ of a sum of elements in the $BI_{k,b}$ of the $BI_k$ to a sum of elements in the $BI_{k,f}$ of the $BI_k$, wherein a height of the $BI_{k,f}$ is $\lfloor h/8+1 \rfloor^{th}$ row to $\lfloor 7h/8 \rfloor^{th}$ row of the $BI_k$, and a width of the $BI_{k,f}$ is $\lfloor w/8+1 \rfloor^{th}$ column to $\lfloor 7w/8 \rfloor^{th}$ column of the $BI_k$, a symbol "$\lfloor \ \rfloor$" refers to round down; a Binary matrix dividing sub-component, configured to divide the region $BI_{k,b}$ into four parts by taking a $[h/2]^{th}$ row and a $[h/2]^{th}$ column of the $BI_k$ as a boundary, and respectively calculate proportion of the number of elements with value being 1 to the number of all elements in each of the four parts, and count the number $N_{iv}$ of proportions which are greater than or equal to a third predetermined threshold in the four proportions; and a scenario-conversion frame judging sub-component, configured to, when $R_k$ is greater than a fourth predetermined threshold and $N_{iv}$ is greater than a fifth predetermined threshold, determine that the current $k^{th}$ video frame is a scenario-conversion frame; when $R_k$ is not greater than or equal to the fourth predetermined threshold and/or $N_{iv}$ is not greater than or equal to the fifth predetermined threshold, exit the scenario-conversion frame detection on the current $k^{th}$ video frame.

In an example embodiment, the detecting component comprises: a jitter frame and ghosting frame detecting component, wherein the jitter frame and ghosting frame detecting component comprises: a First gradient frame determining sub-component, configured to, when a $(k-1)^{th}$ video frame is a gradient frame, determine that the current $k^{th}$ video frame is also the gradient frame, and exit a entire distortion detection of the current $k^{th}$ video frame; when the $(k-1)^{th}$ video frame is not the gradient frame, invoke a Second gradient frame determining sub-component; the Second gradient frame determining sub-component, configured to, when a significant movement area proportion of a current $k^{th}$ video frame is equal to a significant movement area proportion of the $(k-1)^{th}$ video frame, determine that the current $k^{th}$ video frame is the gradient frame, and exit the entire distortion detection of the current $k^{th}$ video frame; when the significant movement area proportion of the current $k^{th}$ video frame is not equal to the significant movement area proportion of the $(k-1)^{th}$ video frame, invoke the a Jitter frame detecting sub-component; the Jitter frame detecting sub-component, configured to calculate a differential matrix between a luminance matrix of the $(k-1)^{th}$ video frame and a luminance matrix of a $(k+1)^{th}$ video frame, take absolute values of all elements of the differential matrix and then sum all the elements; when a sum is 0, determine that the $(k+1)^{th}$ video frame is a jitter frame, and the $k^{th}$ video frame is a normal frame, and exit the entire distortion detection of the current $k^{th}$ video frame; when the sum is not 0, invoke a Ghosting frame detecting sub-component; and the Ghosting frame detecting sub-component, configured to, when the significant movement area proportion of the current $k^{th}$ video frame is greater than or equal to the sixth predetermined threshold, determine that the current $k^{th}$ video frame is a ghosting frame, and the $(k+1)^{th}$ video frame is the normal frame; when the significant movement area proportion of the current $k^{th}$ video frame is not greater than or equal to a sixth predetermined threshold, determine that the $k^{th}$ video frame is the normal frame.

In an example embodiment, the evaluating component comprises: a scenario information weight calculating sub-component, configured to split the video into scenarios according to the result of the scenario-conversion frame detection, when a current $k^{th}$ video frame is the first absolute regular frame after a closest scenario-conversion frame, sum a space complexity, a colour complexity, a luminance mean value and a significant movement area proportion of the current $k^{th}$ video frame to obtain a scenario information weight used for weighting the scenario.

In an example embodiment, the evaluating component comprises: a distortion coefficient Calculating sub-component, configured to calculate the distortion coefficient K according to formula 1;

$$K=0.07 \ln(44P_{frz}-41.28) \times F_{frz}+0.29F_{jit}+0.19F_{gst} \qquad \text{formula 1;}$$

where $F_{frz}$, $F_{jit}$ and $F_{gst}$ are respectively flag bits of a frozen frame, a jitter frame and a ghosting frame of a current frame, and one and only one of the three flag bits is 1, and other flag bits are all 0, 1 representing that there is a corresponding type of distortion in an evaluated video frame, and 0 representing that there is no corresponding type of distortion in the evaluated video frame; $P_{frz}$ is a freeze sustainability coefficient, and $P_{frz}=n\times\log_2(2+t)$, where n is the number of continuous frames accumulated in this freeze, and t is the number of times of freezes of which duration is longer than a second predetermined time at a single time within a first predetermined time before this freeze occurs, wherein the second predetermined time is less than the first determined time.

In an example embodiment, the evaluating component comprises: a Video quality determining sub-component, configured to calculate the quality Q of the video in the time domain on the terminal side according to formula 2; $Q=1-m\sqrt{A_q}\times\text{Expr}\times K$ formula 2; where m is an expansion coefficient, Aq is a significant movement area proportion of a previous normal frame of a video frame on which the distortion occurs, Expr is a scenario information weight, and K is a distortion coefficient.

The embodiments of the disclosure have the following beneficial effects:

By way of introducing a technology for extracting a significant movement area of the video and a technology for detecting the conversion among the scenario of the video, the video characteristics such as moveability are extracted to reduce a evaluation error, at the same time, with respect to video decoding recovery strategy, extension classification is performed on distortion types, thereby solving the problems for the no-reference technology in time domain on the terminal side in the related art that the evaluation error is big, the movements is overlooked, and the indicator is single; compared with the related art, highlighting the influence of the moveability and the video content on the video quality, increasing the closeness of the evaluation result to subjective perception, expanding an evaluation system of time domain distortions of the video, and reducing the probability of misjudgments.

The above description is only a summary of the technical solutions of the disclosure, and in order to more clearly understand the technical means of the embodiments of the disclosure, they can be implemented according to the content of the description; and to make the and other objectives, features and advantages of the embodiments of the disclosure more comprehensible, the following specifically illustrates the detailed description of the embodiments of the disclosure.

BRIEF DESCRIPTION OF THE DRAWINGS

By way of reading the following description of the example embodiments, various other advantages and benefits will become clear and apparent to those skilled in the art. The drawings are only used for showing the example embodiments, but are not considered the limitation of the disclosure. Throughout the drawings, the same reference numbers represent the same parts. In the accompanying drawings.

DETAILED DESCRIPTION OF EMBODIMENTS

The exemplary embodiments of this disclosure will be described in detail below with reference to the accompanying drawings. Although the drawings display the exemplary embodiments of this disclosure, it should be understood that this disclosure can be realized in various forms and should not be limited to the embodiments stated here. On the contrary, these embodiments are provided to understand this disclosure more thoroughly, and fully convey the scope of this disclosure to those skilled in the art.

In order to solve the problems for the no-reference technology in time domain on the terminal side in the related art that the evaluation error is big, the movements is overlooked, and the indicator is single, a no-reference method and device for evaluating quality of video in time domain on terminal side are provided in the embodiment of the disclosure. In the method, a technology for extracting a significant movement area of the video and a technology for detecting the conversion among the scenario of the video are introduced, and the video characteristics such as moveability are extracted to reduce the evaluation error, at the same time, with respect to video decoding recovery strategy, extension classification is performed on distortion types. In the following, the embodiments of the disclosure will be described in further detail with combination of the accompanying drawings and the embodiments. It should be understood that specific embodiments described here are only used for illustrating the disclosure and not intended to limit the disclosure.

Method Embodiments

Figure 1:
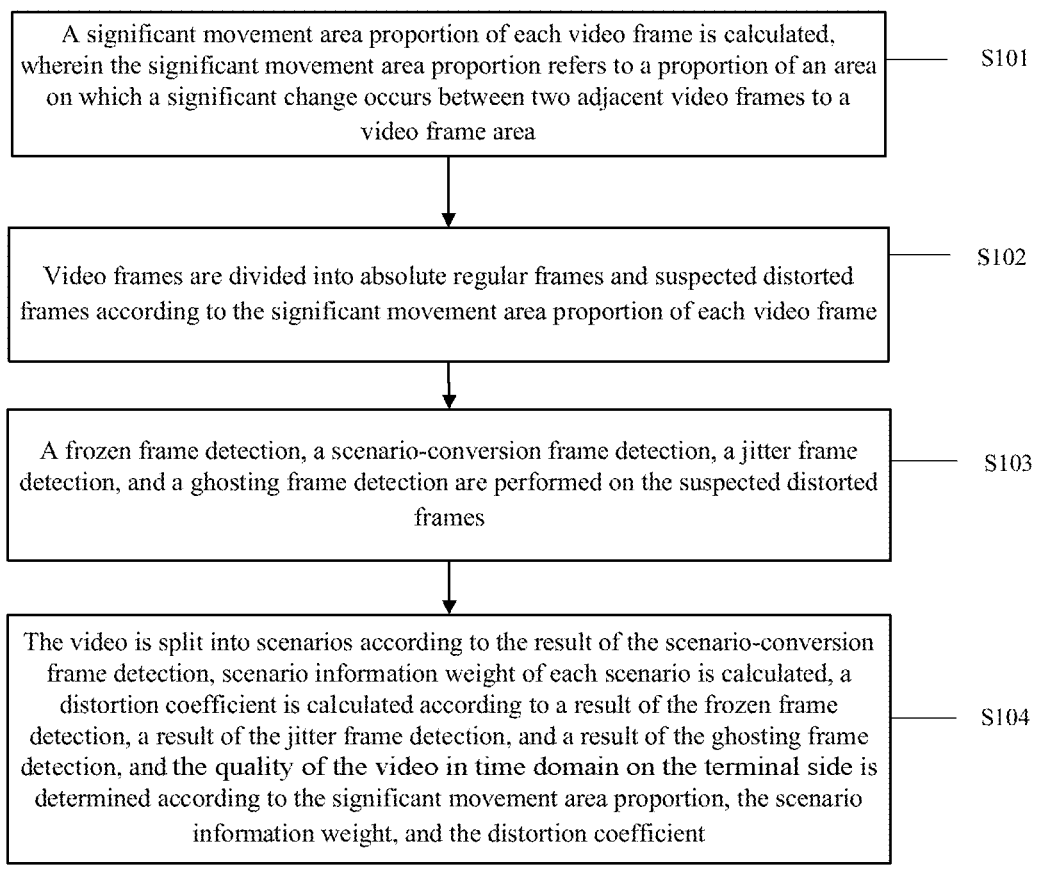
FIG. 1 is a flowchart of a method for evaluating quality of video in the time domain on the terminal side according to an embodiment of the present disclosure.

A method for evaluating quality of video in the time domain on the terminal side is provided according to an embodiment of the disclosure; FIG. 1 is a flowchart of a method for evaluating quality of video in the time domain on the terminal side according to an embodiment of the disclosure; as shown in FIG. 1, the method for evaluating quality of video in the time domain on the terminal side comprises the following processing:

Step 101, a significant movement area proportion of each video frame is calculated, wherein the significant movement area proportion refers to a proportion of an area on which a significant change occurs between two adjacent video frames to a video frame area;

that is to say, in step 101, a luminance difference between video frames is required to be calculated. When calculating the luminance difference, a technology for extracting significant movement area of the video is introduced, and the application of the technology is optimized. The index of the "significant movement area proportion" is considered to be the core of the evaluation on the quality of the video in time domain. The significant movement area proportion is the proportion of a movement part where the human eyes are more sensitive between video frames to a whole frame area. The quality of the video in time domain is evaluated according to this technical index in the embodiment of the disclosure, and the influence of the moveability on the quality of the video is measured by analysing the attribute of the index, thereby improving the accuracy of the evaluation.

In addition, a technology of Gaussian pyramid is introduced in the calculating of the significant movement area proportion, which enhances the adaptability of the method to the change of the size of the video. A significant movement area is extracted by using a binaryzation threshold anomaly detection method based on median filtering and noise reduction. A proportion of a significant movement to a whole frame area is calculated.

In an optional example, in step 101, in which the significant movement area proportion of each video frame is calculated, the step comprises:

Step 1011, according to a playing progress, the current $k^{th}$ video frame is decoded to a luminance chrominance YUV space to obtain a luminance matrix $Y_k$;

Step 1012, when it is determined that the current $k^{th}$ video frame is the first frame of the video, the previous frame of the current $k^{th}$ video frame is set to be a frame of which the pixel values are all zero, and the step 1013 is executed; otherwise, the step 1013 is directly executed;

Step 1013, the luminance matrix $Y_k$ of the current $k^{th}$ video frame is performed Gaussian filtering, and a filtering result is performed down-sampling; in an example, in the step 1013, the luminance matrix $Y_k$ of the current $k^{th}$ frame is performed Gaussian filtering of which the frame window is 3×3, the mean value is 0 and the standard deviation is 0.5, and the filtering result is performed ¼a down-sampling, where a is a natural number;

Step 1014, the step 1013 is repeatedly executed n−1 times to obtain a Gaussian image pyramid $PMD_k$ containing n matrices with different scales, wherein a scale represents the number of times of Gaussian filtering and down-sampling operations that have been performed on the current matrix, and when the scale is 1, the current matrix is a source matrix $Y_k$, and n is the total number of the scales; in the embodiments of the disclosure, n can be set as 3-5;

Step 1015, for the Gaussian image pyramid $PMD_k$ of the current $k^{th}$ video frame and the $PMD_{k-1}$ of the $(k-1)^{th}$ video frame, absolute value of difference of each element between matrices in scale s is calculated to obtain a difference matrix $M_{k,s}$, and a difference pyramid $DPMD_k$ is constituted according to the difference matrix in each scale, wherein $M_{1,s}$ in the difference matrix $M_{k,s}$ is an all-zero matrix;

Step 1016, the bilinear interpolation is performed on the difference matrix in all the scales in the $DPMD_k$ except the scale 1, the size of the difference matrix is normalized to be the same as the size of the source matrix $Y_k$, and after interpolation, n difference matrices of the $DPMD_k$ including the source matrix $Y_k$ is averaged to obtain a normalized difference matrix $Z_k$;

Step 1017, median filtering and noise reduction is performed on the $Z_k$ to obtain $Z_{km}$, and a threshold θ is set, 1 is assigned to elements of which the values are greater than or equal to θ in the $Z_{km}$ and 0 is assigned to the elements of which the values are less than θ, a binary matrix $BI_k$ is obtained; and Step 1018, the $BI_k$ is summed and then the sum is divided by the frame pixel area of the current $k^{th}$ video frame to obtain the significant movement area proportion of the current $k^{th}$ video frame.

Wherein an area with a significant change occurring between two adjacent video frames can be ensured to be obtained by the Gaussian filtering and the Gaussian pyramid image.

Step 102, all the video frames are divided into absolute regular frames and suspected distorted frames according to the significant movement area proportions;

in step 102, by means of initial difference analysis between frames, all the frames are divided into "absolute regular frames" which are determined and "suspected distorted frames" which are required to be detected further.

In an optional example, the step 102 comprises the following processes:

step 1021, in the case where the significant movement area proportion of the current $k^{th}$ video frame is 0, it is determined that the current $k^{th}$ video frame is a suspected frozen frame, where k>1;

step 1022, in the case where the significant movement area proportion of the current $k^{th}$ video frame is more than twice the significant movement area proportion of a previous video frame the current $k^{th}$ video frame and is greater than a first predetermined the current $k^{th}$ video frame (optionally, in the embodiments of the disclosure, the first predetermined threshold can be 0.1, and the first threshold can be determined according to an empirical value of those skilled in the art), and the previous video frame thereof is a non-frozen frame, it is determined that the current $k^{th}$ video frame is a suspected scenario-conversion frame;

Step 1023, in the case where the significant movement area proportion of the current $k^{th}$ video frame is equal to the significant movement area proportion of the $(k+1)^{th}$ video frame, it is determined that the current $k^{th}$ video frame and the $(k+1)^{th}$ video frame are suspected jitter frames or suspected ghosting frames; and Step 1024, in the case where the significant movement area proportion of the current $k^{th}$ video frame does not conform to the cases in the step 1021 to step 1023, and the previous video frame of the current $k^{th}$ video frame is the non-frozen frame, it is determined that the current $k^{th}$ video frame is the absolute regular frame.

Step 103, a frozen frame detection, a scenario-conversion frame detection, a jitter frame detection, and a ghosting frame detection are performed on the suspected distorted frames;

in the embodiments of the disclosure, a three-index-system "frozen", "ghosting" and "jitter" of the quality of the video in time domain is established when data is analysed. The "ghosting" and "jitter" may occur only when a B frame exists in a group of picture (GOP). The detection of the three indexes are all analysed according to a window of the significant movement area proportion of the current frame and the adjacent frames of the current frame.

In addition, in step 102 and step 103, a two-step analysis and detection method with respect to the time domain distortion is used, the first step (step 102), according to the characteristics of the significant movement area proportion when the three distortions occur, the suspected distorted frame in the video and a possible distortion type of the frame are identified; and the second step (step 103), the detection and analysis is further performed only on the suspected distorted frame. Such that an immediate data volume can be decreased, a great amount of repetitive detections can be avoided, and the complexity of an algorithm can be reduced.

In the second step of the two-step analysis and detection method, the calculating of the space complexity is introduced, which is used for representing the level of detail of video frame contents. At the same time, "colour complexity" is proposed, which is used for representing the richness of colour of the video frame contents. In addition, in the second step of the two-step analysis and detection method, the erroneous judging detection is performed on all the three indexes by the significant movement area of an adjacent frame, so as to prevent erroneously judging a normal effect of the video as distortion. Two possible erroneous judging types are proposed, which comprises: one is that the "screen frame" is erroneously judged as a frozen frame, the other is that "gradient frame" is erroneously judged as a ghosting frame. Moreover, in step 103, a scenario evaluation method based on the significant movement area proportion is further proposed, and a scenario-conversion frame is detected by using a mutation of the significant movement area proportion and a proportion of the significant movement in a frame background part.

In an optional example, in step 103, performing frozen frame detection on the suspected distorted frame refers to: it is detected whether the suspected distorted frame is a frozen frame, and the interference of the "screen frame (a stationary frame in an original video)" is excluded at the same time. Preferably, the following processing is comprised:

step 1031a, all elements in a difference matrix $M_{k,1}$ with the scale being 1 are summed, when the summing result is 0, the step 1032a is executed; otherwise, it is determined that the current $k^{th}$ video frame is a normal frame and the entire distortion detection of the current $k^{th}$ video frame exits;

step 1032a, when it is judged that the $(k-1)^{th}$ video frame is a frozen frame, it is determined that the current $k^{th}$ video frame is also the frozen frame and the entire distortion detection of the current $k^{th}$ video frame exits; otherwise, the step 1033a is executed;

step 1033a, when it is judged that the $(k-1)^{th}$ video frame is a screen frame, it is determined that the current $k^{th}$ video frame is also the screen frame and the entire distortion detection of the current $k^{th}$ video frame exits; otherwise, the step 1034a is executed;

step 1034a, a space complexity $O_s$ and a colour complexity $O_c$ of the current $k^{th}$ video frame are calculated; and step 1035a, a screen coefficient $P=1-0.6O_s-0.4O_c+0.2b$ of the current $k^{th}$ video frame is calculated, and when the P is greater than or equal to a second threshold (in an optional example, in the embodiments of the disclosure, the second predetermined threshold can be 0.5, and the second threshold can be determined according to an empirical value of those skilled in the art), it is determined that the current $k^{th}$ video frame is the screen frame and is not the frozen frame; otherwise, it is determined that the current $k^{th}$ video frame is the frozen frame, where b is a binary parameter, and when the $(k-1)^{th}$ video frame is a scenario-conversion frame or the significant movement area proportions of the $(k-1)^{th}$ video frame to the $(k-2)^{th}$ video frame are non-zero and equal, b=1; otherwise, b=0.

Performing scenario-conversion frame detection on the suspected distorted frame refers to: a scenario-conversion frame is detected, so as to prepare to calculate a scenario information weight subsequently by taking the scenario-conversion frame as the boundary. The following processing is comprised:

step 1031b, a prospect matrix region $BI_{k,f}$ is divided from the middle of a binary matrix $BI_k$ with the width being w and the height being h, and the other region of the $BI_k$ is determined as a background region $BI_{k,b}$. A ratio $R_k$ of a sum of elements in the $BI_{k,b}$ of the $BI_k$ to a sum of elements in the $BI_{k,f}$ of the $BI_k$ is calculated, wherein the height of the $BI_{k,f}$ is the $\lfloor h/8+1 \rfloor^{th}$ row to the $\lfloor 7h/8 \rfloor^{th}$ row of the $BI_k$, and the width of the $BI_{k,f}$ is the $\lfloor w/8+1 \rfloor^{th}$ column to the $\lfloor 7w/8 \rfloor^{th}$ column of the $BI_k$, the symbol "$\lfloor \rfloor$" refers to round down;

step 1032b, by taking the $[h/2]^{th}$ row and the $[h/2]^{th}$ column of the $BI_k$ as the boundary, the region $BI_{k,b}$ is divided into four parts, and proportions of the number of elements with the value being 1 to the number of all elements in each of the four parts are respectively calculated, and then the number $N_{iv}$ of proportions which are greater than or equal to a third predetermined threshold in the four proportions (preferably, in the embodiments of the disclosure, the third predetermined threshold can be 0.3, and the third threshold can be determined according to an empirical value of those skilled in the art) is counted; and step 1033b, when $R_k$ is greater than or equal to a fourth predetermined threshold and $N_{iv}$ is greater than or equal to a fifth predetermined threshold (preferably, in the embodiments of the disclosure, the fourth predetermined threshold can be 0.3, and the fifth predetermined threshold can be 3; and the fourth threshold and the fifth threshold can be determined according to an empirical value of those skilled in the art), it is determined that the current $k^{th}$ video frame is a scenario-conversion frame; otherwise, the scenario-conversion frame detection on the current $k^{th}$ video frame exits.

Performing jitter frame detection and ghosting frame detection on the suspected distorted frame refers to: whether the suspected distorted frame is a ghosting frame or a jitter frame is detected, and the interference of the "gradient frame (a frame evenly changing in an original video)" is excluded at the same time. The following processing is comprised:

step 1031c, when the $(k-1)^{th}$ video frame is a gradient frame, it is determined that the current $k^{th}$ video frame is also the gradient frame and the entire distortion detection of the current $k^{th}$ video frame exits; otherwise, the step 1032c is executed;

step 1032c, when the significant movement area proportion of the current $k^{th}$ video frame is equal to the significant movement area proportion of the $(k-1)^{th}$ video frame, it is determined that the current $k^{th}$ video frame is the gradient frame and the entire distortion detection of the current $k^{th}$ video frame exits; otherwise, the step 1033c is executed;

step 1033c, a differential matrix between a luminance matrix of the $(k-1)^{th}$ video frame and that of the $(k+1)^{th}$ video frame is calculated, the absolute value of all elements of the differential matrix is taken and then all the elements are summed; when the sum is 0, it is determined that the $(k+1)^{th}$ video frame is a jitter frame, and the $k^{th}$ frame is a normal frame, the entire distortion detection of the current $k^{th}$ video frame exits and the step 1034c is executed; otherwise, the step 1034c is directly executed; and step 1034c, when the significant movement area proportion of the current $k^{th}$ video frame is greater than or equal to a sixth predetermined threshold (preferably, in the embodiments of the disclosure, the sixth predetermined threshold can be 0.03, and the sixth threshold can be determined according to an empirical value of those skilled in the art), it is determined that the current $k^{th}$ video frame is a ghosting frame, and the $(k+1)^{th}$ video frame is the normal frame; otherwise, it is determined that the $k^{th}$ video frame is the normal frame.

Step 104, a video is split into scenarios on the basis of the result of the scenario-conversion frame detection. Scenario information weights of various scenario are calculated. A distortion coefficient is calculated according to a result of the frozen frame detection, a result of the jitter frame detection, and a result of the ghosting frame detection. It is determined the quality of the video in time domain on the terminal side according to the significant movement area proportion, the scenario information weights, and the distortion coefficient.

In step 104, splitting the video into scenarios on the basis of the result of the scenario-conversion frame detection and calculating the scenario information weights of the scenarios comprises: the video is split into the scenarios on the basis of the result of the scenario-conversion frame detection, and information such as the moveability, the content space and the richness of colour of a scenario segment are simultaneously provided. When the current $k^{th}$ video frame is the first absolute regular frame after the closest scenario-conversion frame, the space complexity, the colour complexity, the luminance mean value and the significant movement area proportion of the current $k^{th}$ video frame are summed respectively to obtain the scenario information weights used for weighting in the scenario.

Preferably, in step 104, the distortion coefficient is obtained by the subjective experimental result of the three indexes, wherein the distortion coefficient is taken as a basis for evaluating a total score. A freeze duration coefficient is proposed in the evaluation for the freeze, wherein the freeze duration is used for measuring the influence of the freeze duration coefficient in the freeze distortion.

In step 104, the distortion coefficient is calculated according to the frozen frame detection result, the jitter frame detection result, and the ghosting frame detection result, wherein the step comprises that: the distortion coefficient K is calculated according to formula 1;

$$K=0.07 \ln(44P_{frz}-41.28) \times F_{frz}+0.29F_{jit}+0.19F_{gst} \quad \text{formula 1;}$$

where $F_{frz}$, $F_{jit}$ and $F_{gst}$ are respectively flag bits of a frozen frame, a jitter frame and a ghosting frame of the current frame, and one and only one of the three flag bits is 1, and other flag bits are all 0, 1 representing that there is a corresponding type of distortion in the evaluated video frame, and 0 representing that there is no corresponding type of distortion in the evaluated video frame; $P_{frz}$ is a freeze sustainability coefficient, and $P_{frz}=n \times \log_2(2+t)$, where n is the number of continuous frames accumulated in this freeze, and t is the number of times of freezes of which the duration is longer than the second predetermined time at a single time within the first predetermined time before this freeze occurs, wherein the second predetermined time is less than the first determined time.

In step 104, determining the quality of the video in time domain on the terminal side according to the significant movement area proportion, the scene information weights, and the distortion coefficient comprises that: the quality Q of the video in time domain on the terminal side is calculated according to formula 2;

$$Q=1-m\sqrt{A_q} \times \text{Expr} \times K \quad \text{formula 2;}$$

where m is an expansion coefficient, $A_q$ is a significant movement area proportion of a previous normal frame of a video frame on which the distortion occurs, Expr is a scenario information weight, and K is a distortion coefficient.

The technical solutions of the embodiments of the disclosure are illustrated in detail in combination with accompany drawings hereinafter.

Figure 2:
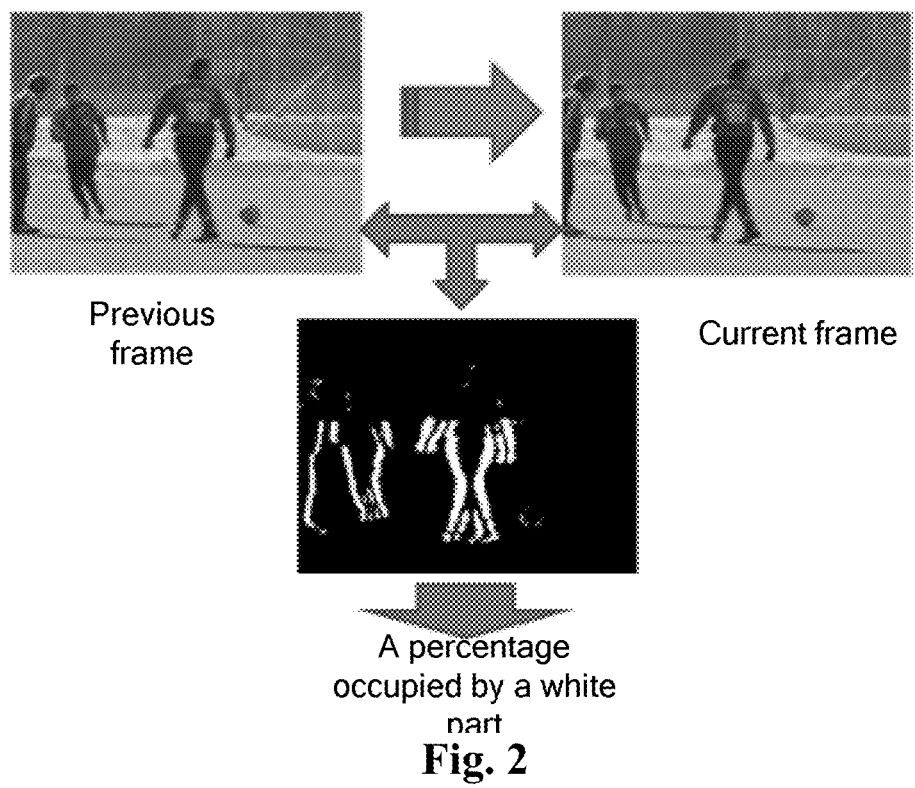
FIG. 2 is a schematic diagram of a significant movement area proportion according to an embodiment of the present disclosure.

Firstly, the significant movement area proportion serves as a difference index between frames is required to be calculated. The embodiment of the disclosure is mainly based on the characteristic of moveability, and the "significant movement area proportion" of the video including real-time applications therein is proposed. The significant movement area proportion refers to a proportion of an area with a significant change occurring between two adjacent frames to a whole video frame area; preferably, FIG. 2 is a schematic diagram of a significant movement area proportion according to an embodiment of the disclosure. In order to perform characteristic extraction on a distortion in the time domain of the video frame and perform calculating and analysis with respect to characteristic values, a certain index which can better represent the difference between two frames and also has a smaller data volume (a less dimension) is required to be calculated. The significant movement area proportion, as such an index, is required to extract a significant part in a movement area through a series of steps. As shown in FIG. 2, in a binary difference image, the white represents a significant movement part, and the black represents a non-significant movement part.

After a Gaussian image pyramid of the current frame and the Gaussian image pyramid of the previous frame is obtained, per-pixel differences of the two are required to be calculated to obtain a difference pyramid, so as to adapt to the visual perception under different resolution ratios. Further calculating on the difference pyramid is required to recover each scale layer thereof to an original resolution ratio, so as to obtain a normalized difference matrix. Abnormal detection is performed on the normalized difference matrix, and results thereof are summed and divided by the matrix size to calculate the significant movement area proportion, such that a great deal of data of an original luminance matrix is condensed into a digit from 0 to 1, and finally, the significant movement area proportion is obtained.

Figure 3:
FIG. 3 is a schematic diagram of a frozen distortion according to an embodiment of the present disclosure.
Figure 4:
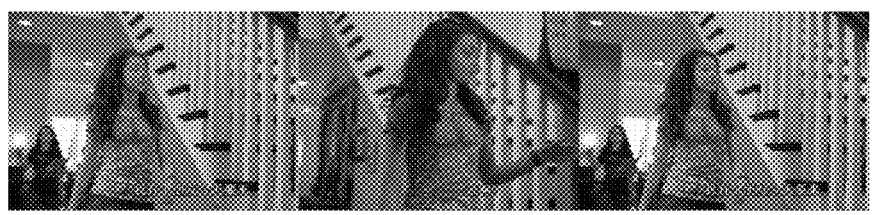
FIG. 4 is a schematic diagram of a jitter distortion according to an embodiment of the present disclosure.
Figure 5:
FIG. 5 is a schematic diagram of a ghosting distortion according to an embodiment of the present disclosure.

FIG. 3 is a schematic diagram of a frozen distortion according to an embodiment of the disclosure; FIG. 4 is a schematic diagram of a jitter distortion according to an embodiment of the disclosure; and FIG. 5 is a schematic diagram of a ghosting distortion according to an embodiment of the disclosure. As shown in FIG. 3 to FIG. 5, three distortion forms with respect to a video containing a B frame which are summarized in the embodiments of the disclosure are respectively frozen, jitter and ghosting. Frozen is the case that picture pause occurs on a video when the video is cached or decoded. The feature of the frozen is that there is completely no difference between a certain frame and a previous frame thereof. Jitter is the case that instant picture back and recovery occurs on a video which is originally smooth. The feature of the jitter is that in three continuous frames with jitter occurring, the difference between the first frame and the second frame is same as that of the second frame and the third frame, and there is no difference between the second frame and the third frame. The difference between the second frame and the third frame may occur only when there is a B frame in a Gop. Ghosting is the situation that sudden trajectory blur and even ghost image occurs on a moving object, and a viscous feeling of time is caused. The feature of the ghosting is that the difference between a certain frame and the previous frame thereof and the difference between the certain frame and the next frame thereof are the same, but there is a difference between the previous frame thereof and the next frame thereof. The difference between the previous frame and the next frame may occur only when there is a B frame in a Gop.

According to the presentation of distortion characteristic mappings on the significant movement area proportion, by means of an initial analysis, all the frames are divided into "absolute regular frames" and "suspected distorted frames" which are required to be detected further. In the second analysis, processing is only performed on the suspected distorted frames, the interference of special situations are excluded, and the distortion types are further determined.

In an example embodiment, further detection is firstly performed on frames which are suspected to be frozen frames. Frames appearing a subtly recognizable difference (such as glimmer and wind blowing) are not belong to the frozen frame, and should be authenticated by calculating the sum of the absolute values of the differences between the luminance matrices of the two frames. When there are some static frames in a video, in order to prevent the frames being misjudged as the frozen frames, in the embodiments of the disclosure, for the typical situation, the type of frames is named as a "screen frame", which mainly comprises the situations such as some program LOGOS, slogans or thanks, and has the characteristic of little detail information, a single colour and being directly jumped or gradient to from a scenario-conversion frame often.

Subsequently, the scenario-conversion frame is required to be detected. Scenario conversion does not belong to the distortion, but it identifies the coming of a new scenario. The same scene between the scenario-conversion frames often contains similar information, such as the space, the colour and the moveability, and plays an important role on the calculating of scene-related evaluation weights. The scenario-conversion frame mainly has two characteristics, the first one is that the significant movement area proportion is relatively high and is much higher than an adjacent frame; and the second one is that a significant movement change part is distributed in various directions of an image. Calculating is performed according to the characteristics so as to detect whether a certain frame is the scenario-conversion frame.

Finally, further detection is also required to be performed on suspected ghosting/jitter frames. Although representation forms of the jitter and ghosting are different, but are very similar in the relationship of the significant movement area proportions: the former is that the significant movement area proportion of the current frame is the same as that of the previous frame thereof; and the latter is that the significant movement area proportion of the current frame is the same as that of the next frame thereof. The jitter has the phenomenon of "alternatively frozen" due to the repeat of the frames; however, the ghosting does not have. In addition, the jitter frame and the ghosting frame generally exist independently, and the adjacent frames thereof are generally ordinary frames. When few continuous frames occur the situation similar to the ghosting frame, they are "gradient frames", and should be judged by judging whether the ghosting frames are adjacent to each other.

In addition, scenario information weights are also required to be calculated, the influence degree of the distortion on the video is closely related to content information, such as the level of detail, the richness of colour and the luminance of a current picture, in addition to amount of instantaneous movements. Since in a multi-scenario video, various scenarios are usually different in these pieces of information, the information of each scenario is required to be summarized to be the "scene information weight", and the higher the value, the more easily affected by distortion of the video content in time domain.

In summary, in the embodiments of the disclosure, in order to introduce the influence of the scenario content of the video on the evaluation, the scenario-conversion detection is performed by the significant movement area proportion in the embodiment of the disclosure, and the scenario information weight is calculated with respect to the scene content, which are used for weighting evaluation scores; and the quality of the video is determined by summarizing the calculating results.

Figure 6:
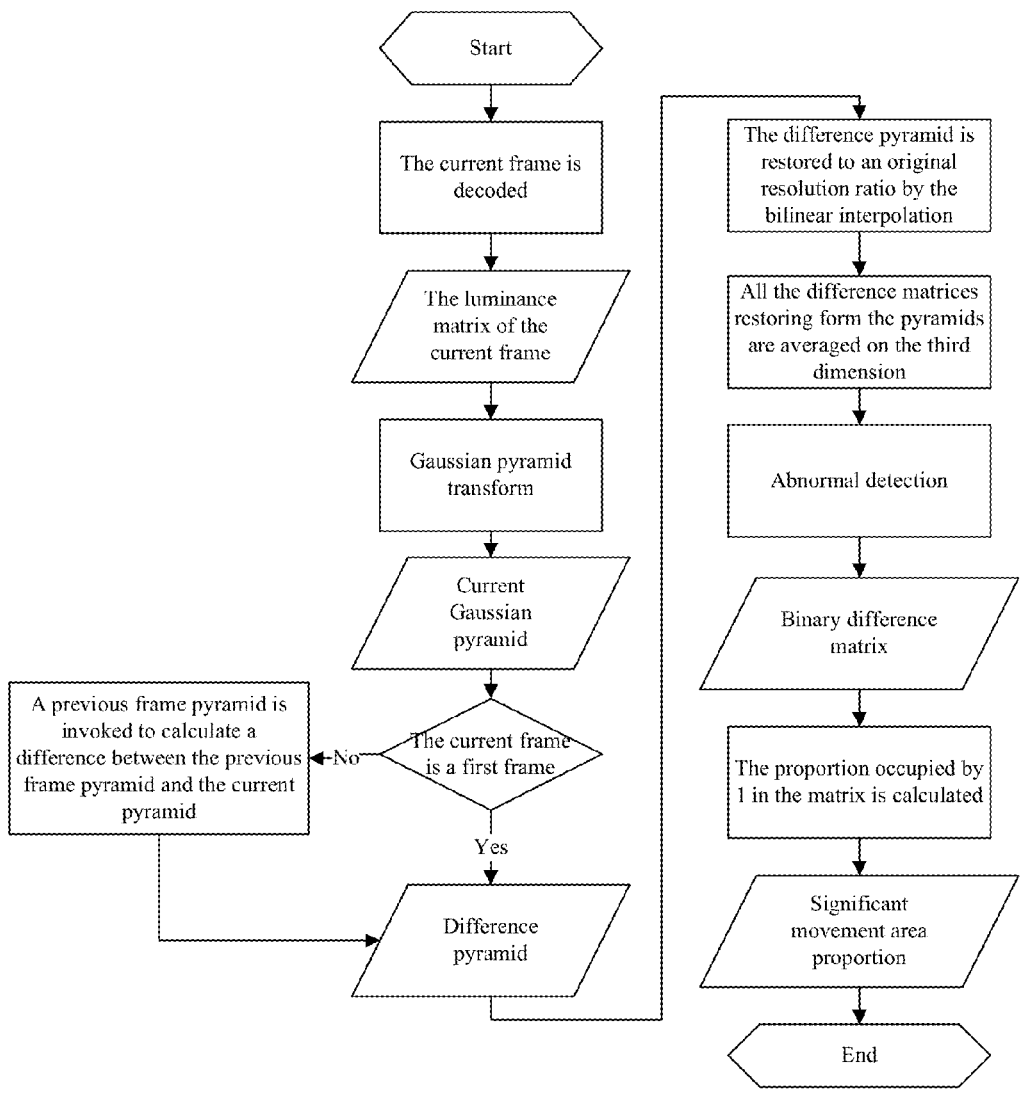
FIG. 6 is a flowchart for extracting a significant movement area proportion according to an embodiment of the present disclosure.

FIG. 6 is a flowchart for extracting a significant movement area proportion according to an embodiment of the disclosure; and as shown in FIG. 6, the following processing is comprised:

Step 610, according to a playing progress, a current frame is decoded to a YUV space.

Step 620, when the current frame is a first frame, the previous frame thereof is set to be a frame of which all pixel values are zero.

Step 630, Gaussian filtering is performed on the luminance matrix $Y_k$ of the current $k^{th}$ frame with the window size being 3×3, the mean value being 0 and the standard deviation being 0.5, and one-quarter down-sampling is performed on a filtering result. Repeatedly the step is executed n−1 times to obtain a Gaussian image pyramid containing n matrices with different scales (a matrix with the scale being 1 is a source matrix $Y_k$). The total number of the scales n is set to be 3~5, and the total number can be appropriately increased according to the increase of a resolution ratio after decoding.

Step 640, for the Gaussian image pyramid $PMD_k$ of the current $k^{th}$ video frame and the $PMD_{k-1}$ of the $(k-1)^{th}$ video frame, absolute values of differences between each element in the matrices in scale s are calculated to obtain a difference matrix $M_{k,s}$. $M_{1,s}$ is an all-zero matrix. The difference matrices in each scale constitute a difference pyramid $DPMD_k$.

Step 650, the bilinear interpolation is performed on the difference matrices in all the scales except the scale 1 in the $DPMD_k$, the size of the difference matrices is normalized to be the same as the source matrix $Y_k$. The n matrices of the $DPMD_k$ including the $Y_k$ therein after interpolation is averaged to obtain a normalized difference matrix $Z_k$.

Step 660, the median filtering and noise reduction are performed on the $Z_k$ to obtain $Z_{km}$, and the abnormal detection is performed on the $Z_{km}$, that is, a threshold θ is set to perform binaryzation on the $Z_{km}$, 1 is assigned to elements which are greater than or equal to θ and 0 is assigned to the elements which are less than θ to obtain a binary matrix $BI_k$.

Figure 7:
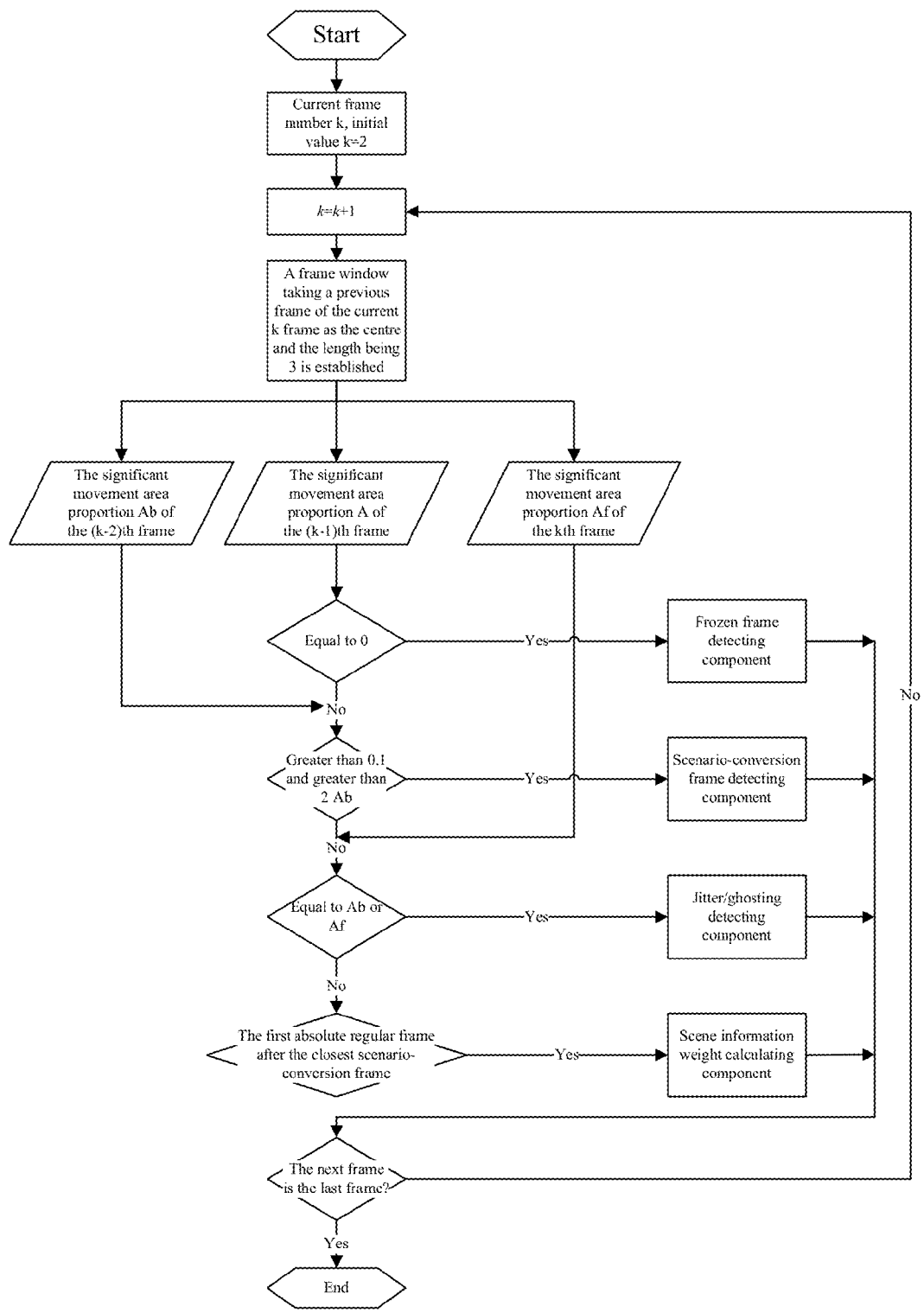
FIG. 7 is a flowchart for extracting an initial distortion analysis according to an embodiment of the present disclosure.

FIG. 7 is a flowchart for extracting an initial distortion analysis according to an embodiment of the disclosure; and as shown in FIG. 7, the following processing is comprised:

Step 710, when the significant movement area proportion of the current $k^{th}$ frame (in addition to the first frame of the whole video) is 0, the frame is regarded as a suspected frozen frame, and YUV data of the frame, a difference matrix $M_{k,1}$ with the scale being 1 and the significant movement area proportions of the $(k-1)^{th}$ frame to $(k-2)^{th}$ frame are sent to a frozen detection component to perform further detection.

Step 720, when the significant movement area proportion of the current $k^{th}$ frame occurs a step phenomenon, that is, the significant movement area proportion of the current $k^{th}$ video frame is more than twice a previous video frame thereof and is greater than 0.1, and the previous video frame thereof is a non-frozen frame, the frame is regarded as a suspected scenario-conversion frame, and the YUV data of the frame and the previous frame thereof and a binary difference matrix $BI_k$ of the frame are sent to a scenario-conversion detection component to perform further detection.

Step 730, when the significant movement area proportion of the $k^{th}$ frame and the significant movement area proportion of the $(k+1)^{th}$ frame are of the same, the two frames are regarded as suspected jitter/ghosting frames, and all the significant movement area proportions and the YUV data from the $(k-2)^{th}$ frame to the $(k+1)^{th}$ frame are sent to a jitter/ghosting detection component to perform further detection.

Step 740, when the significant movement area proportion of the current $k^{th}$ frame does not conform to that stated in steps 710-730, and the previous frame is a non-frozen frame, the frame is regarded a normal frame. When the frame is the first regular frame after the closest scenario-conversion frame, the YUV data and the significant movement area proportion of the frame are sent to a scene weight calculating component.

The frozen detection component comprises the following steps:

Step 1, all elements in the matrix $M_{k,1}$ are summed, when the result is 0, detection is continuously performed; otherwise, it is regarded that the $k^{th}$ video frame is a normal frame, and the entire distortion detection of the current $k^{th}$ video frame exits.

Step 2, when the $(k-1)^{th}$ frame is a frozen frame, it is judged that the $k^{th}$ frame is also the frozen frame, and the entire distortion detection of the current $k^{th}$ video frame exits; and when the $(k-1)^{th}$ frame is a screen frame (a frame which is stationary relative to the previous frame in the original frame, and see step 4 for the judging manner), the $k^{th}$ frame is also regarded the screen frame, that is, not being the frozen frame, and the entire distortion detection of the $k^{th}$ frame exits; otherwise, frozen detection is continuously performed.

Step 3, a space complexity $O_s$ and a colour complexity $O_c$ of the $k^{th}$ frame are calculated. The space complexity $O_s$ is a result of the square root of a sum after Sobel filtering is performed on the matrix in the horizontal direction and the vertical direction, which representing the richness of the image content of the frame. The colour complexity $O_c$ is a proportion of an area appearing more colours to the whole frame area, and the taken colour is a result of a frame image changed index image according to 64-grade uniform quantization, if the proportion value is larger, it is explained that the richness of the colour is lower.

Step 4, the screen coefficient $P=1-0.6O_s-0.4O_c+0.2b$ of the frame is calculated, where b is a binary parameter, and when the $(k-1)^{th}$ video frame is a scenario-conversion frame or the significant movement area proportion of the $(k-1)^{th}$ frame and the significant movement area proportion of the $(k-2)^{th}$ frame are non-zero and equal, b is set to 1; otherwise, b is set to 0. When P is greater than or equal to 0.5, the $k^{th}$ frame is the screen frame, that is, not the frozen frame, and the detection of the $k^{th}$ frame exits; otherwise, the $k^{th}$ frame is the frozen frame.

The scenario-conversion detection comprises the following steps:

Step 1, a prospect matrix region $BI_{k,f}$ is divided in the middle of a matrix $BI_k$ with the width being w and the height being h, wherein the height thereof is the $\lfloor h/8+1 \rfloor^{th}$ row to the $\lfloor 7h/8 \rfloor^{th}$ row of the original matrix, and the width thereof is the $\lfloor w/8+1 \rfloor^{th}$ column to the $\lfloor 7w/8 \rfloor^{th}$ column of the original matrix. The other area of the matrix $BI_k$ is a background area $BI_{k,b}$. A ratio $R_k$ of a sum of elements in the $BI_{k,b}$ of the $BI_k$ to a sum of elements in the $BI_{k,f}$ thereof is calculated. The symbol "$\lfloor \; \rfloor$" refers to round down.

Step 2, taking the $[h/2]^{th}$ row and the $[h/2]^{th}$ column of the matrix $BI_k$ as the boundary, the background region matrix $BI_{k,b}$ is divided into four parts, and proportions of the number of elements with the value being 1 in the four parts to this region are respectively calculated, and the number $N_{i,v}$ in the four proportions which are greater than or equal to 0.3 is counted.

Step 3, when $R_k \geq 0.3$ and $N_{i,v} \geq 3$, the $k^{th}$ frame is the scenario-conversion frame; otherwise, the $k^{th}$ frame is the normal frame, that is, the $k^{th}$ frame is not the scenario-conversion frame, and the detection of the $k^{th}$ frame exits.

The jitter/ghosting detection comprises the following steps:

Step 1, when the $(k-1)^{th}$ frame is a gradient frame (frames of which all the pixel values are in a uniform increasing or decreasing state), the $k^{th}$ frame is also the gradient frame, and the detection of the $k^{th}$ frame exits; otherwise, the jitter/ghosting detection is continuously performed.

Step 2, when the significant movement area proportion of the $k^{th}$ frame is equal to that of the $(k-1)^{th}$ frame, the $k^{th}$ frame is the gradient frame, and the detection of the $k^{th}$ frame exits; otherwise, detection is continuously performed.

Step 3, a differential matrix between a luminance matrix of the $(k-1)^{th}$ frame and that of the $(k+1)^{th}$ frame is calculated, and after taking the absolute value on all elements, all elements is summed; when the sum is 0, the $(k+1)^{th}$ frame is the jitter frame, and the detection of the $k^{th}$ frame exits; otherwise, jitter/ghosting detection is continuously performed. Although the significant movement area proportions of continuous three frames of the jitter are similar when the ghosting occurs, in actual, the jitter occurs on the third frame of the continuous three frames; therefore, only in this case, the $(k+1)^{th}$ frame is called the "jitter frame".

step 4, when the significant movement area proportion of the $k^{th}$ frame is greater than or equal to 0.03, the current $k^{th}$ frame is the ghosting frame, and the $(k+1)^{th}$ frame is the normal frame; otherwise, it is determined that the $k^{th}$ frame is the normal frame.

The calculating process of the scenario information weight calculating comprises:

when the current frame is the first regular frame after the scenario-conversion frame, the space complexity, the colour complexity, the luminance mean value and the significant movement area proportion of the frame are respectively summed to obtain the scenario information weights used for weighting the scenario.

The calculating process for determining the quality of the video in time domain on the terminal side comprises:

an evaluation model is established, and a distortion situation obtained through the analyses can be converted to a final objective no-reference score. A score model is mainly obtained by multiplying four coefficients, and the formula is as follows:

$$Q = 1 - m\sqrt{A_q} \times \text{Expr} \times K$$

The four coefficients are respectively:

1. an expansion coefficient m: the function of which is to adjust a score range, and according to an actual situation of a score trend, it can be adjusted in the range of 2~5.

2. a square root value of an instantaneous significant movements area proportion Aq: Aq is the significant movement area proportion of a previous normal frame of a frame of which the distortion occurs. Aq can represent the influence degree of this distortion on the current moment: the greater the current instantaneous amount of the movement, the greater the influence caused by the distortion. The square root value is taken here to reduce the influence of the Aq on the score range.

3. a scenario information weight Expr: which is obtained through the scenario information weight component, and the scenario information weights of frames between two scenario-conversion frames are the same.

4. distortion coefficient K: a coefficient which directly hooks into a distortion type, and different distortion types corresponds to one corresponding coefficient. The frozen coefficient also comprises a freeze duration coefficient. The formula is as follows:

$$K=0.07\ \ln(44P_{frz}-41.28) \times F_{frz}+0.29F_{jit}+0.19F_{gst}$$

where $F_{frz}$, $F_{jit}$ and $F_{gst}$ are respectively flag bits of a frozen frame, a jitter frame and a ghosting frame of a current frame. One and only one of the three flag bits is 1, and the flag bit represents that the evaluated frame has this type of distortion, and all the other flag bits are 0. The coefficients 0.07, 0.29 and 0.19 in the formula are learned subjective evaluation results, and the meaning thereof are respectively the average probabilities of the frozen, jitter and ghosting of a single frame being identified by an observer in a great amount of test videos in a subjective experiment, and the coefficients can be appropriately adjusted according to new subjective experiments or actual needs.

$P_{frz}$ is a freeze sustainability coefficient, and the calculating formula thereof is: $P_{frz}=n \times \log_2(2+t)$, where n is the number of continuous frames accumulated in this freeze, and t is the number of times of freezes of which the duration longer than 0.4 seconds at a single time within 300 seconds before this freeze occurs.

It should be noted that the realization of the scenario-conversion detection in the embodiments of the disclosure is not limited to the methods proposed in the embodiments of the disclosure; and in another embodiment, complex scene cutting can be performed by matching with lens movement detection. For example, gray scale significant detection can be used to divide an ROI, and scenario detection is performed according to the shape change of the ROI. In addition, in the embodiments of the disclosure, calculating methods for some parameters can be selected according to the requirements of the evaluation accuracy. For example, the space complexity can be evaluated by using methods such as gray scale information entropy and edge energy, and the colour complexity can be evaluated by using methods such as colour partial correlation.

In summary, by means of the technical solutions of the embodiments of the disclosure, by way of introducing the technology for extracting the video significant movement area and the technology for detecting the video scenario-conversion, video characteristics such as moveability are extracted to reduce the evaluation error, at the same time, with respect to video decoding recovery strategy, extension classification is performed on distortion types, thereby solving the problems for the no-reference technology in time domain on the terminal side in the related art that the evaluation error is big, the movements is overlooked, and the indicator is single; compared with the related art, highlighting the influence of the moveability and the video content on the video quality, increasing the closeness of the evaluation result to subjective perception, expanding an evaluation system for the distortions of the video in time domain, and reducing the probability of misjudgments.

Device Embodiments

Figure 8:
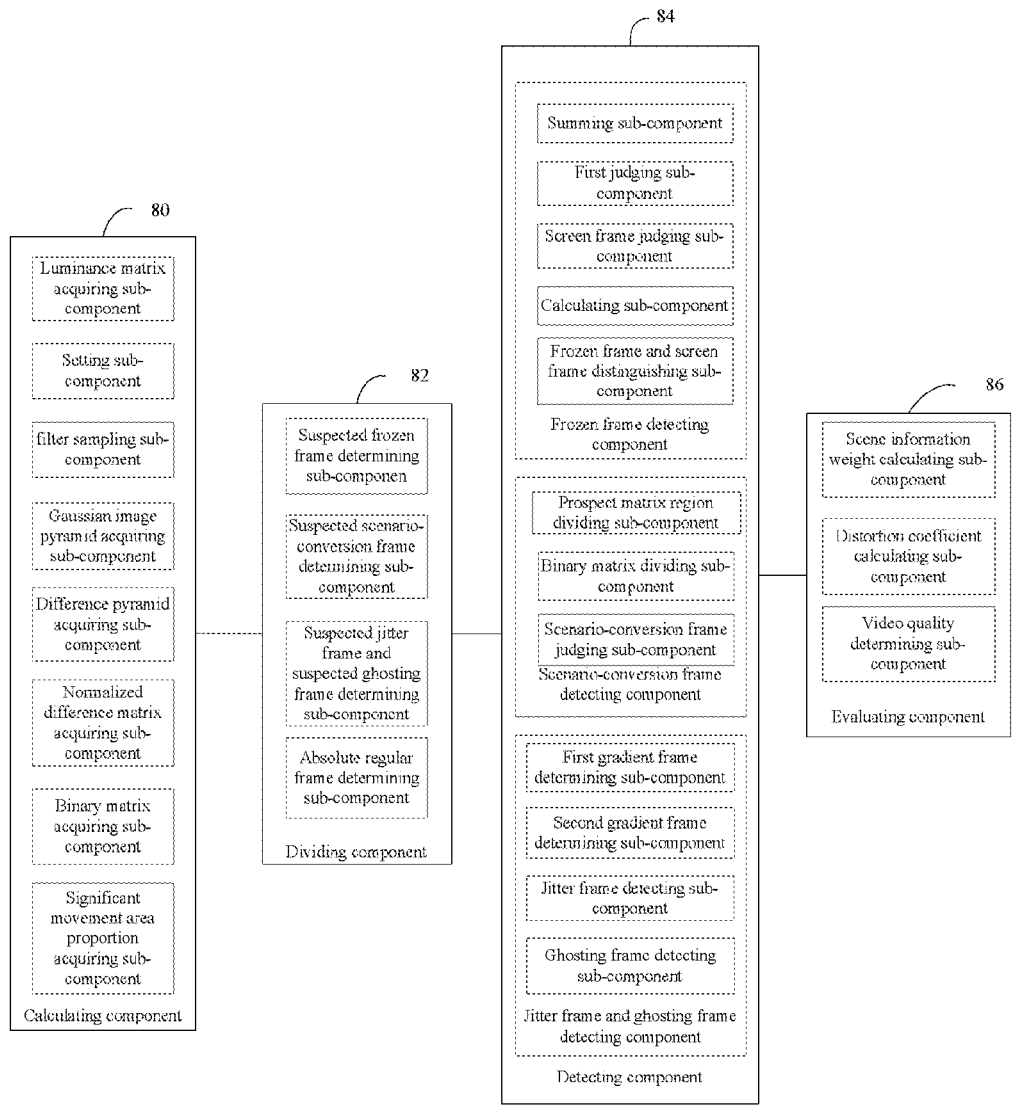
FIG. 8 is a structural schematic diagram of a device for evaluating the quality of the video in time domain on the terminal side according to an embodiment of the present disclosure.

According to the embodiments of the disclosure, a device for evaluating the quality of the video in time domain on the terminal side is provided; FIG. 8 is a structural schematic diagram of a device for evaluating the quality of the video in time domain on the terminal side according to an embodiment of the disclosure; as shown in FIG. 8, the device for evaluating the quality of the video in time domain on the terminal side according to an embodiment of the disclosure comprises: a calculating component 80, a dividing component 82, a detecting component 84, and an evaluating component 86, and each component in the embodiments of the disclosure is hereinafter described in detail.

The calculating component 80, configured to calculate a significant movement area proportion of each video frame, wherein the significant movement area proportion refers to a proportion of an area on which a significant change occurs between two adjacent video frames to a video frame area;

and the calculating component 80 comprises:

a luminance matrix acquiring sub-component, configured to, according to a playing progress, decode the current $k^{th}$ video frame to a luminance chrominance YUV space to obtain a luminance matrix $Y_k$;

a setting sub-component, configured to, when it is determined that the current $k^{th}$ video frame is the first frame of the video, a previous frame of the current $k^{th}$ video frame is set to be a frame of which all pixel values are all zero, and invoke a filter sampling sub-component; otherwise, directly invoke the filter sampling sub-component;

the filter sampling sub-component, configured to perform Gaussian filtering on the luminance matrix $Y_k$ of the current $k^{th}$ video frame, and perform down-sampling on a filtering result; and the filter sampling sub-component is set to perform Gaussian filtering on the luminance matrix $Y_k$ of the current $k^{th}$ frame of which the frame window is 3×3, the mean value is 0 and the standard deviation is 0.5, and perform $\frac{1}{4}^a$ down-sampling on the filtering result, where a is a natural number;

a Gaussian image pyramid acquiring sub-component, configured to repeatedly invoke the Gaussian image pyramid acquiring sub-component n−1 times to obtain a Gaussian image pyramid $PMD_k$ containing n matrices with different scales, wherein a scale represents the number of times of Gaussian filtering and down-sampling operations that have been performed on a current matrix, and when the scale is 1, the current matrix is a source matrix $Y_k$, and n is the total number of the scales;

a difference pyramid acquiring sub-component, configured to, for the Gaussian image pyramid $PMD_k$ of the current $k^{th}$ video frame and the $PMD_{k-1}$ of the $(k-1)^{th}$ video frame, calculate absolute value of difference of each element between matrices in scale s to obtain a difference matrix $M_{k,s}$, and constitute a difference pyramid $DPMD_k$ according to the difference matrix in each scale, wherein $M_{1,s}$ in the difference matrix $M_{k,s}$ is an all-zero matrix;

a normalized difference matrix acquiring sub-component, configured to perform bilinear interpolation on the difference matrixes in all the scales except the scale 1 in the $DPMD_k$, normalize the size of the difference matrix to be the same as the size of the source matrix $Y_k$, and average n difference matrices of the $DPMD_k$ including the source matrix $Y_k$ therein after interpolation to obtain a normalized difference matrix $Z_k$;

a binary matrix acquiring sub-component, configured to perform median filtering and noise reduction on the $Z_k$ to obtain $Z_{km}$, and set a threshold θ, assign 1 to elements in the $Z_{km}$ which are greater than or equal to θ and assign 0 to the elements in the $Z_{km}$ which are less than θ to obtain a binary matrix $BI_k$; and a significant movement area proportion acquiring sub-component, configured to sum the $BI_k$ and then divide the sum by the frame pixel area of the current $k^{th}$ video frame to obtain the significant movement area proportion of the current $k^{th}$ video frame.

The dividing component 82, configured to divide all the video frames into absolute regular frames and suspected distorted frames according to the significant movement area proportion of each video frame;

and the dividing component 82 comprises:

a suspected frozen frame determining sub-component, configured to, in the case where the significant movement area proportion of the current $k^{th}$ video frame is 0, determine that the current $k^{th}$ video frame is a suspected frozen frame, where k>1; a suspected scenario-conversion frame determining sub-component, configured to, in the case where the significant movement area proportion of the current $k^{th}$ video frame is more than twice the significant movement area proportion of the previous video frame of the current $k^{th}$ video frame and is greater than a first predetermined threshold, and the previous video frame of the current $k^{th}$ video frame is a non-frozen frame, determine that the current $k^{th}$ video frame is a suspected scenario-conversion frame; a suspected jitter frame and suspected ghosting frame determining sub-component, configured to, in the case where the significant movement area proportion of the current $k^{th}$ video frame is equal to the significant movement area proportion of the $(k+1)^{th}$ video frame, determine that the current $k^{th}$ video frame and the $(k+1)^{th}$ video frame are suspected jitter frames or suspected ghosting frames; and an absolute regular frame determining sub-component, configured to, in the case where the significant movement area proportion of the current $k^{th}$ video frame does not conform to the above various sub-components, and the previous video frame of the current $k^{th}$ video frame is the non-frozen frame, determine that the current $k^{th}$ video frame is the absolute regular frame.

The detecting component 84, configured to perform a frozen frame detection, a scenario-conversion frame detection, a jitter frame detection, and a ghosting frame detection on the suspected distorted frames;

and the detecting component 84 comprises: a frozen frame detecting component 84, wherein the frozen frame detecting component 84 comprises: a summing sub-component, which is configured to sum all elements in the difference matrix $M_{k,1}$ with the scale being 1, and when the summing result is 0, a first judging sub-component is invoked; otherwise, it is determined that the current $k^{th}$ video frame is not the frozen frame and the frozen detection is ended; a first judging sub-component, which is configured to, when it is judged that the $(k-1)^{th}$ video frame is a frozen frame, determine that the current $k^{th}$ video frame is also the frozen frame and exit the entire distortion detection of the current $k^{th}$ video frame; otherwise, invoke a screen frame judging sub-component; the screen frame judging sub-component, which is configured to, when it is judged that the $(k-1)^{th}$ video frame is a screen frame, determine that the current $k^{th}$ video frame is also the screen frame and exit the entire distortion detection of the current $k^{th}$ video frame; otherwise, invoke a calculating sub-component; the calculating sub-component, which is configured to calculate a space complexity $O_s$ and a colour complexity $O_c$ of the current $k^{th}$ video frame; and a frozen frame and screen frame distinguishing sub-component, which is configured to calculate a screen coefficient $P=1-0.6O_s-0.4O_c+0.2b$ of the current $k^{th}$ video frame, if the P is greater than or equal to the second threshold, determine that the current $k^{th}$ video frame is the screen frame and is not the frozen frame and exit the entire distortion detection of the current $k^{th}$ video frame; otherwise, determine that the current $k^{th}$ video frame is the frozen frame, where b is a binary parameter, and when the $(k-1)^{th}$ video frame is a scenario-conversion frame or the significant movement area proportions of the $(k-1)^{th}$ video frame and the $(k-2)^{th}$ video frame are non-zero and equal, b=1; otherwise, b=0.

The detecting component 84 comprises: a scenario-conversion frame detecting component 84, wherein the scenario-conversion frame detecting component 84 comprises: a prospect matrix region dividing sub-component, which is configured to divide a prospect matrix region $BI_{k,f}$ from the middle region of a binary matrix $BI_k$ with the width being w and the height being h and determine the other region of the $BI_k$ as a background region $BI_{k,b}$, and calculate a ratio $R_k$ of a sum of elements in the $BI_{k,b}$ of the $BI_k$ to a sum of elements in the $BI_{k,f}$ thereof, wherein the height of the $BI_{k,f}$ is the $\lfloor h/8+1 \rfloor^{th}$ row to the $\lfloor 7h/8 \rfloor^{th}$ row of the $BI_k$, and the width thereof is the $\lfloor w/8+1 \rfloor^{th}$ column to the $\lfloor 7w/8 \rfloor^{th}$ column of the $BI_k$, and the symbol "$\lfloor \; \rfloor$" refers to round down; a binary matrix dividing sub-component, which is configured to divide the region $BI_{k,b}$ into four parts by taking the $[h/2]^{th}$ row and the $[h/2]^{th}$ column of the $BI_k$ as the boundary, and respectively calculate proportions of the number of elements with the value being 1 to the number of all elements in each of the four parts, and count the number $N_{iv}$ of the proportions which are greater than or equal to a third predetermined threshold in the four proportions; and a scenario-conversion frame judging sub-component, which is configured to, when $R_k$ is greater than a fourth predetermined threshold and $N_{iv}$ is greater than a fifth predetermined threshold, determine that the current $k^{th}$ video frame is a scenario-conversion frame; otherwise, exit the scenario-conversion frame detection on the current $k^{th}$ video frame.

In an optional example, the detecting component 84 comprises: a jitter frame and ghosting frame detecting component 84, wherein the jitter frame and ghosting frame detecting component 84 comprises: a first gradient frame determining sub-component, which is configured to, when the $(k-1)^{th}$ video frame is a gradient frame, determine that the current $k^{th}$ video frame is also the gradient frame, and exit the distortion detection of the current $k^{th}$ video frame; otherwise, invoke a second gradient frame determining sub-component; the second gradient frame determining sub-component, which is configured to, when a significant movement area proportion of the current $k^{th}$ video frame is equal to the significant movement area proportion of the $(k-1)^{th}$ video frame, determine that the current $k^{th}$ video frame is the gradient frame, and exit the distortion detection of the current $k^{th}$ video frame; otherwise, invoke the a jitter frame detection sub-component; the jitter frame detection sub-component, which is configured to calculate a differential matrix between a luminance matrix of the $(k-1)^{th}$ video frame and that of the $(k+1)^{th}$ video frame, take the absolute values of all elements of the differential matrix and then sum all elements of the differential matrix; when the sum is 0, determine that the $(k+1)^{th}$ video frame is a jitter frame, and the $k^{th}$ frame is a normal frame, and exit the distortion detection of the current $k^{th}$ video frame; otherwise, invoke a ghosting frame detecting sub-component; and the ghosting frame detecting sub-component, which is configured to, when the significant movement area proportion of the current $k^{th}$ video frame is greater than or equal to the sixth predetermined threshold, determine that the current $k^{th}$ video frame is a ghosting frame, and the $(k+1)^{th}$ frame is the normal frame; otherwise, determine that the $k^{th}$ frame is the normal frame.

The evaluating component 86, which is configured to split a video into scenarios according to the result of the scenario-conversion frame detection, calculate scenario information weight of each scenarios, calculate a distortion coefficient according to a result of the frozen frame detection, a result of the jitter frame detection, and a result of the ghosting frame detection, and determine the quality of the video in time domain on the terminal side according to the significant movement area proportion, the scenario information weight, and the distortion coefficient.

The evaluating component 86 comprises: a scenario information weight calculating sub-component, which is configured to split the video into the scenarios according to the result of the scenario-conversion frame detection, and when the current $k^{th}$ video frame is the first absolute regular frame after the closest scenario-conversion frame, sum the space complexity, the colour complexity, the luminance mean value and the significant movement area proportion of the current $k^{th}$ video frame to obtain the scenario information weight used for weighting the scenarios.

The evaluating component 86 comprises: a distortion coefficient calculating sub-component, which is configured to calculate the distortion coefficient K according to formula 1;

$$K=0.07 \ln(44P_{frz}-41.28) \times F_{frz}+0.29F_{jit}+0.19F_{gst} \quad \text{formula 1;}$$

where $F_{frz}$, $F_{jit}$ and $F_{gst}$ are respectively flag bits of a frozen frame, a jitter frame and a ghosting frame of a current frame, and one and only one of the three flag bits is 1, and other flag bits are all 0, 1 representing that there is a corresponding type of distortion in the evaluated video frame, and 0 representing that there is no a corresponding type of distortion in the evaluated video frame; $P_{frz}$ is a freeze sustainability coefficient, and $P_{frz}=n \times \log_2(2+t)$, where n is the number of continuous frames accumulated, and t is the number of times of freezes duration longer than the second predetermined time at a single time within the first predetermined time before this freeze occurs, and the second predetermined time is less than the first determined time.

The evaluating component 86 comprises: a video quality determining sub-component, which is configured to calculate the quality Q of the video in the time domain video on the terminal side according to formula 2;

$$Q=1-m\sqrt{A_q} \times \text{Expr} \times K \quad \text{formula 2;}$$

where m is an expansion coefficient, $A_q$ is a significant movement area proportion of a previous normal frame of a video frame of which the distortion occurs, Expr is a scenario information weight, and K is a distortion coefficient.

It should be noted that the dividing of the functional components is only an application example of the embodiments of the disclosure; and in the embodiments of the disclosure, other component dividing methods can be used to complete the technical solutions of the embodiments of the disclosure.

Figure 9:
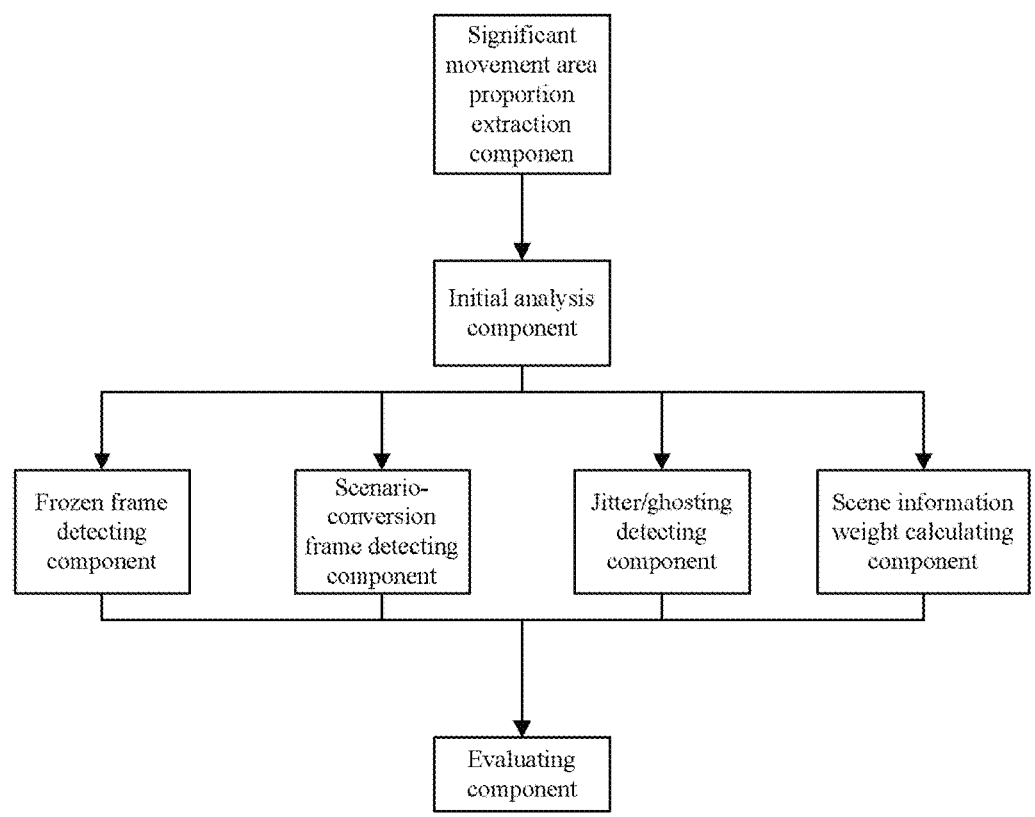
FIG. 9 is a preferred structural schematic diagram of a device for evaluating quality of video in the time domain on the terminal side according to an embodiment of the present disclosure.

FIG. 9 is a preferred structural schematic diagram of a device for evaluating quality of video in the time domain on the terminal side according to an embodiment of the disclosure; as shown in FIG. 9, the device of the embodiments of the disclosure comprises the following related components: a significant movement area proportion extraction component, an initial distortion analysis component, a freeze detecting component, a scenario-conversion detecting component, a ghosting/jitter detecting component, a scene information weight calculating component and an evaluating component.

The significant movement area proportion extraction component is configured to calculate the significant movement area proportion serving as a difference index between frames. The embodiments of the disclosure mainly based on moveability characteristics, and the "significant movement area proportion" confirming to the video including real-time applications is proposed therein. The significant movement area proportion refers to a proportion of an area with a significant change occurring between two adjacent frames to a whole video frame area, and is an evaluation index for video real-time moveability which is proposed in the embodiments of the disclosure.

The initial distortion analysis component is configured to divide all the frames into "absolute regular frames" and "suspected distorted frames" which are required to be detected further.

The freeze detecting component is configured to perform further detection on suspected frozen frames. Frames appearing a subtly recognizable difference (such as glimmer and wind blowing) are not belong to the frozen frame, and should be authenticated by calculating the sum of the absolute values of the differences between the luminance matrices of the two frames. When there are some static frames in a video, in order to prevent the frames being misjudged as the frozen frames, in the embodiments of the disclosure, in this typical situation, the type of frames is named as a "screen frame", which mainly comprises the situations such as some program LOGOS, slogans or thanks, and has the characteristic of little detail information, a single colour and being directly jumped or gradient to from a scenario-conversion frame often.

The scenario-conversion detecting component is configured to detect scenario-conversion frames. Scenario conversion does not belong to the distortion, but it identifies the coming of a new scenario. The same scenario between the scenario-conversion frames often contains similar information, such as the space, the colour and the moveability, and plays an important role on the calculating of scenario-related evaluation weights. The scenario-conversion frame mainly has two characteristics, the first one is that the significant movement area proportion is relatively high and is much higher than an adjacent frame; and the second one is that a significant movement change part is distributed in various directions of an image. Calculating is performed according to the characteristics so as to detect whether a certain frame is the scenario-conversion frame.

The ghosting/jitter detecting component is configured to perform further detection on suspected ghosting/jitter frames. Although representation forms of the jitter and ghosting are different, but are very similar in the relationship of the significant movement area proportions: the former is that the significant movement area proportion of the current frame is the same as that of the previous frame thereof; and the latter is that the significant movement area proportion of the current frame is the same as that of the next frame thereof. The jitter has the phenomenon of "alternatively frozen" due to the repeat of the frames; however, the ghosting does not have. In addition, the jitter frame and the ghosting frame are generally exist independently, and the adjacent frames thereof are generally ordinary frames. When few continuous frames occur of which the situation is similar to the ghosting frame, they are "gradient frames", and should be judged by judging whether the ghosting frames are adjacent to each other.

The scenario information weight calculating component is configured to calculate scenario information weights. The influence degree of the distortion on the video is closely related to content information, such as the level of detail, the richness of colour and the luminance of a current picture, in addition to the amount of instantaneous movements. Since in a multi-scene video, various scenarios are usually different in these pieces of information, the information of each scenarios is required to be summarized to be the "scene information weight", and the higher the value, the more easily affected by time domain distortion the video content.

The evaluating component is configured to calculate evaluation scores of a video frame.

In this device embodiments, reference may be made to the relevant description in the method embodiments for the detail content of the related components, and will not be described here redundantly.

It should be noted that the realization of the scenario-conversion detection in the embodiments of the disclosure is not limited to the methods proposed in the embodiments of the disclosure; and in another embodiment, complex scene cutting can be performed by matching with lens movement detection. For example, gray scale significant detection can be used to divide an ROI, and scenario detection is performed according to the shape change of the ROI. In addition, in the embodiments of the disclosure, calculating methods for some parameters can be selected according to the requirements of the evaluation accuracy. For example, the space complexity can be evaluated by using methods such as gray scale information entropy and edge energy, and the colour complexity can be evaluated by using methods such as colour partial correlation.

In summary, by means of the technical solutions of the embodiments of the disclosure, by way of introducing a technology for extracting a significant movement area of the video and a technology for detecting the conversion among the scenario of the video, video characteristics such as moveability are extracted to reduce a evaluation error, at the same time, with respect to video decoding recovery strategy, extension classification is performed on distortion types, thereby solving the problems for the no-reference technology in time domain on the terminal side in the related art that the evaluation error is big, the movements is overlooked, and the indicator is single; compared with the related art, thus highlighting the influence of the moveability and the video content on the video quality, increasing the closeness of the evaluation result to subjective perception, expanding an evaluation system for video time domain distortions, and reducing the probability of misjudgments.

The algorithms and displays provided herein is not inherently related to any particular computers, virtual systems or other equipment. Various universal systems can also be used together with the teaching based thereon. According to the description above, the structure required for constructing this type of system is obvious. In addition, the embodiments of the disclosure are also not aiming at any particular programming language. It should be understood that a variety of programming languages may be used to implement the content of the embodiments of the disclosure as described herein, and the description made on the particular languages above is to disclose an optimum implementation of the embodiments of the disclosure.

In the description provided herein, numerous details are explained. However, it is understood that the embodiments of the disclosure may be practiced without these details. In some examples, common method, structures and techniques have not been shown in detail so as not to obscure the understanding of this description.

Similarly, it should be understood that in order to simply this disclosure and help to understand one or more of the aspects of the disclosure, in the description of the exemplary embodiments of the disclosure above, sometimes various features of the embodiments of the disclosure may be grouped into a single embodiment, a figure or the description thereof together. However, the disclosed method should not be construed to reflect the following intentions, that is, the claimed embodiments of the disclosure require more characteristics than the characteristics clearly recorded in each claim. More specifically, as that reflected in the following claims, an aspect of the disclosure is less than all the characteristics of a single embodiment disclosed in front. Therefore, the claims following the implementation is explicitly incorporated into the implementation thereby, with each claim standing on its own as a separate embodiment of this invention.

Those skilled in the art could understand that adaptive changes can be performed on the components in the equipment of the embodiment, and the components are set in one or more equipment which is different from that of the embodiment. Components or units or components in the embodiments can be combined into one component or unit or component; in addition, they can be divided into a plurality of sub-components or sub-units or sub-components. In addition to such characteristics and/or at least some of the processes or the units are mutually exclusive, any combination can be used to combine all the feature disclosed in the description (including accompanying claims, abstract and drawings) and all the processes or units of any method and device disclosed in this way. Each characteristic disclosed in the description (including accompanying claims, abstract and drawings) can be replaced with alternative features providing the same, equivalent or similar purposes unless specifically noted otherwise.

In addition, a person skilled in the art could understand that although some embodiments described herein comprise some features included in other embodiments rather than the other features, the combination of the features of different embodiments means being in the scope of the disclosure and forming different embodiments. For example, in the following claims, any one of the claimed embodiments can be used in any combination manner.

Each component embodiment of the disclosure can be realized by using the hardware, or a software component operated on one or more processors, or a combination thereof. A person skilled in the art should understand that a microprocessor or a digital signal processor (DSP) can be used in practice to realize some or all of the functions of some or all of the components in a device for terminal side time domain video quality evaluation according to the embodiments of the disclosure. The embodiments of the disclosure can be implemented as equipment or device programs (for example, computer programs and computer program products) used for executing a part or all of the methods described herein. Such programs used for realizing the embodiments of the disclosure can be stored in a computer readable medium, or can have the forms of one or more signals. Such signals can be obtained by downloading same from the Internet, or can be provided on a carrier signal, or can be provided in any other forms.

It should be noted that the embodiments is to explain the disclosure rather than to limit the disclosure, and a person skilled in the art can design a substitute embodiment without departing from the scope of the appended claims. In the claims, any reference symbol between the parentheses should not be constructed to limit the claims. The word "contain" does not exclude that there are elements and steps which are not recited in the claims. The word "a" or "an"

between elements does not exclude there are a plurality of such elements. The embodiments of the disclosure can be realized by means of hardware including several different elements and appropriately programmed computers. In a unit claim where several devices are listed, several of these devices can be embodied through the same hardware item. The use of the words first, second and third does not represent any sequence. These words can be construed as names.

INDUSTRIAL APPLICABILITY

The technical solutions of the embodiments of the disclosure can be applied to the technical evaluation field of video objective quality, which solve the problems for the no-reference technology in time domain on the terminal side in the related art that the evaluation error is big, the movements is overlooked, and the indicator is single, highlight the influence of the moveability and the video content on the video quality, increase the closeness of the evaluation result to subjective perception, expands an evaluation system for video time domain distortions, and reduces the probability of misjudgments.

What is claimed is:

1. A method for evaluating quality of a video in a time domain on a terminal side, comprising:
   calculating a significant movement area proportion of each video frame, wherein the significant movement area proportion refers to a proportion of an area on which a significant change occurs between two adjacent video frames to a video frame area;
   dividing video frames into absolute regular frames and suspected distorted frames according to the significant movement area proportion of each video frame;
   performing a frozen frame detection, a scenario-conversion frame detection, a jitter frame detection, and a ghosting frame detection on the suspected distorted frames; and
   splitting the video into scenarios according to a result of the scenario-conversion frame detection, calculating scenario information weight of each scenario, calculating a distortion coefficient according to a result of the frozen frame detection, a result of the jitter frame detection, and a result of the ghosting frame detection, and determining the quality of the video in the time domain on the terminal side according to the significant movement area proportion, the scenario information weight, and the distortion coefficient.

2. The method according to claim 1, wherein calculating the significant movement area proportion of each video frame comprises:
   step 11, according to a playing progress, decoding a current $k^{th}$ video frame to a luminance chrominance YUV space to obtain a luminance matrix $Y_k$;
   step 12, when it is determined that the current $k^{th}$ video frame is the first frame of the video, setting a previous frame of the current $k^{th}$ video frame to be a frame of which pixel values are all zero, and executing step 13; when it is determined that the current $k^{th}$ video frame is not the first frame of the video, directly executing step 13;
   step 13, performing Gaussian filtering on the luminance matrix $Y_k$ of the current $k^{th}$ video frame, and performing down-sampling on a filtering result;
   step 14, repeatedly executing step 13 n−1 times to obtain a Gaussian image pyramid $PMD_k$ containing n matrices with different scales, wherein a scale represents the number of times of Gaussian filtering and down-sampling operations that have been performed on a current matrix, and when the scale is 1, the current matrix is a source matrix $Y_k$, and n is a total number of the scales;
   step 15, for a Gaussian image pyramid $PMD_k$ of the current $k^{th}$ video frame and a $PMD_{k-1}$ of a $(k-1)^{th}$ video frame, calculating absolute value of difference of each element between matrices in scale s to obtain a difference matrix $M_{k,s}$, and constituting a difference pyramid $DPMD_k$ according to the difference matrix in each scale, wherein $M_{1,s}$ in the difference matrix $M_{k,s}$ is an all-zero matrix;
   step 16, performing bilinear interpolation on the difference matrixes in all the scales except scale 1 in the $DPMD_k$, normalizing a size of the difference matrix to be the same as a size of source matrix $Y_k$, and averaging n difference matrices of the $DPMD_k$ including the source matrix $Y_k$ therein after interpolation to obtain a normalized difference matrix $Z_k$;
   step 17, performing median filtering and noise reduction on the $Z_k$ to obtain $Z_{km}$, and setting a threshold $\theta$, assigning 1 to elements in the $Z_{km}$ which are greater than or equal to $\theta$ and assigning 0 to elements in the $Z_{km}$ which are less than $\theta$ to obtain a binary matrix $BI_k$; and
   step 18, summing the $BI_k$ and then dividing the sum by a frame pixel area of the current $k^{th}$ video frame to obtain the significant movement area proportion of the current $k^{th}$ video frame.

3. The method according to claim 2, wherein step 13 comprises:
   performing Gaussian filtering on the luminance matrix $Y_k$ of the current $k^{th}$ frame with a frame window being 3×3, a mean value being 0 and a standard deviation being 0.5, and performing $\frac{1}{4}^a$ down-sampling on a filtering result, where a is a natural number.

4. The method according to claim 1, wherein dividing the video frames into the absolute regular frames and the suspected distorted frames according to the significant movement area proportion of each video frame comprises:
   step 21, when a significant movement area proportion of a current $k^{th}$ video frame is 0, determining that the current $k^{th}$ video frame is a suspected frozen frame, where k>1;
   step 22, when the significant movement area proportion of the current $k^{th}$ video frame is more than twice the significant movement area proportion of a previous video frame of the current $k^{th}$ video frame and is greater than a first predetermined threshold, and the previous video frame of the current $k^{th}$ video frame is a non-frozen frame, determining that the current $k^{th}$ video frame is a suspected scenario-conversion frame;
   step 23, when the significant movement area proportion of the current $k^{th}$ video frame is equal to a significant movement area proportion of a $(k+1)^{th}$ video frame, determining that the current $k^{th}$ video frame and the $(k+1)^{th}$ video frame are suspected jitter frames or suspected ghosting frames; and
   step 24, when the significant movement area proportion of the current $k^{th}$ video frame does not conform to cases in step 21 to step 23, and the previous video frame of the current $k^{th}$ video frame is the non-frozen frame, determining that the current $k^{th}$ video frame is the absolute regular frame.

5. The method according to claim 2, wherein performing the frozen frame detection on the suspected distorted frames comprises:

step 31, summing all elements in a difference matrix $M_{k,1}$ with the scale being 1, when a summing result is 0, executing step 32; when the summing result is not 0, determining that the current $k^{th}$ video frame is a normal frame and exiting a entire distortion detection of the current $k^{th}$ video frame;

step 32, when it is judged that a $(k-1)^{th}$ video frame is a frozen frame, determining that the current $k^{th}$ video frame is also the frozen frame and exiting the entire distortion detection of the current $k^{th}$ video frame; when it is judged that the $(k-1)^{th}$ video frame is not the frozen frame, executing step 33;

step 33, when it is judged that the $(k-1)^{th}$ video frame is a screen frame, determining that the current $k^{th}$ video frame is also the screen frame and exiting the entire distortion detection of the current $k^{th}$ video frame; when it is judged that the $(k-1)^{th}$ video frame is not the screen frame, executing step 34;

step 34, calculating a space complexity $O_s$ and a colour complexity $O_c$ of the current $k^{th}$ video frame; and step 35, calculating a screen coefficient $P=1-0.6O_s-0.4O_c+0.2b$ of the current $k^{th}$ video frame, when the P is greater than or equal to the second threshold, determining that the current $k^{th}$ video frame is the screen frame and is not the frozen frame; when the P is not greater than or equal to the second threshold, determining that the current $k^{th}$ video frame is the frozen frame, where b is a binary parameter, and when the $(k-1)^{th}$ video frame is a scenario-conversion frame or a significant movement area proportion of the $(k-1)^{th}$ video frame and a significant movement area proportion of a $(k-2)^{th}$ video frame are non-zero and equal, b=1; when the $(k-1)^{th}$ video frame is not the scenario-conversion frame and/or the significant movement area proportion of the $(k-1)^{th}$ video frame and the significant movement area proportion of the $(k-2)^{th}$ video frame are zero or not equal, b=0.

6. The method according to claim 2, wherein performing the scenario-conversion frame detection on the suspected distorted frames comprises:

step 41, dividing a prospect matrix region $BI_{k,f}$ from a middle region of a binary matrix $BI_k$ with a width being w and a height being h and determining other region of the $BI_k$ as a background region $BI_{k,b}$, and calculating a ratio $R_k$ of a sum of elements in the $BI_{k,b}$ of the $BI_k$ to a sum of elements in the $BI_{k,f}$ of the $BI_k$, wherein a height of the $BI_{k,f}$ is $[h/8+1]^{th}$ row to $[7h/8]^{th}$ row of the $BI_k$, and a width of the $BI_{k,f}$ is $[w/8+1]^{th}$ column to $[7w/8]^{th}$ column of the $BI_k$, a symbol "[ ]" refers to round down;

step 42, dividing the region $BI_{k,b}$ into four parts by taking a $[h/2]^{th}$ row and a $[h/2]^{th}$ column of the $BI_k$ as a boundary, and respectively calculating proportion of the number of elements with value being 1 to the number of all elements in each of the four parts, and counting the number $N_{iv}$ of proportions which are greater than or equal to a third predetermined threshold in the four proportions; and step 43, when $R_k$ is greater than or equal to a fourth predetermined threshold and $N_{iv}$ is greater than or equal to a fifth predetermined threshold, determining that the current $k^{th}$ video frame is a scenario-conversion frame; when $R_k$ is not greater than or equal to the fourth predetermined threshold and/or $N_{iv}$ is not greater than or equal to the fifth predetermined threshold, exiting the scenario-conversion frame detection on the current $k^{th}$ video frame.

7. The method according to claim 1, wherein performing the jitter frame detection and the ghosting frame detection on the suspected distorted frames comprises:

step 51, when a $(k-1)^{th}$ video frame is a gradient frame, determining that the current $k^{th}$ video frame is also the gradient frame and exiting a entire distortion detection of the current $k^{th}$ video frame; when the $(k-1)^{th}$ video frame is not the gradient frame, executing step 52;

step 52, when a significant movement area proportion of a current $k^{th}$ video frame is equal to a significant movement area proportion of the $(k-1)^{th}$ video frame, determining that the current $k^{th}$ video frame is the gradient frame and exiting the entire distortion detection of the current $k^{th}$ video frame; when the significant movement area proportion of the current $k^{th}$ video frame is not equal to the significant movement area proportion of the $(k-1)^{th}$ video frame, executing step 53;

step 53, calculating a differential matrix between a luminance matrix of the $(k-1)^{th}$ video frame and a luminance matrix of a $(k+1)^{th}$ video frame, taking absolute values of all elements of the differential matrix and then summing all the elements; when a sum is 0, determining that the $(k+1)^{th}$ video frame is a jitter frame, and the $k^{th}$ frame is a normal frame, exiting the entire distortion detection of the current $k^{th}$ video frame and executing step 54; when the sum is not 0, executing step 54; and step 54, when the significant movement area proportion of the current $k^{th}$ video frame is greater than or equal to the sixth predetermined threshold, determining that the current $k^{th}$ video frame is a ghosting frame, and the $(k+1)^{th}$ video frame is the normal frame; when the significant movement area proportion of the current $k^{th}$ video frame is not greater than or equal to a sixth predetermined threshold, determining that the $k^{th}$ video frame is the normal frame.

8. The method according to claim 1, wherein splitting the video into scenarios according to the result of the scenario-conversion frame detection and calculating scenario information weight of each scenario comprise:

splitting the video into scenarios according to the result of the scenario-conversion frame detection, when a current $k^{th}$ video frame is the first absolute regular frame after a closest scenario-conversion frame, summing a space complexity, a colour complexity, a luminance mean value and a significant movement area proportion of the current $k^{th}$ video frame to obtain a scenario information weight used for weighting the scenario.

9. The method according to claim 1, wherein calculating the distortion coefficient according to the result of the frozen frame detection, the result of the jitter frame detection, and the result of the ghosting frame detection comprises:

calculating the distortion coefficient K according to formula 1;

$$K=0.07 \ln(44P_{frz}-41.28) \times F_{frz}+0.29F_{jit}+0.19F_{gst} \quad \text{formula 1};$$

where $F_{frz}$, $F_{jit}$ and $F_{gst}$ are respectively flag bits of a frozen frame, a jitter frame and a ghosting frame of a current frame, and one and only one of the three flag bits is 1, and other flag bits are all 0, 1 representing that there is a corresponding type of distortion in an evaluated video frame, and 0 representing that there is no corresponding type of distortion in the evaluated video frame; $P_{frz}$ is a freeze sustainability coefficient, and $P_{frz}=n \times \log_2(2+t)$ where n is the number of continuous frames accumulated in this freeze, and t is the number of times of freezes of which duration is longer than the second predetermined time at a single time within a first predetermined time before this freeze occurs, wherein the second predetermined time is less than the first determined time.

10. The method according to claim 1, wherein determining the quality of the video in time domain on the terminal side according to the significant movement area proportion, the scenario information weight, and the distortion coefficient comprises:
calculating the quality Q of the video in the time domain on the terminal side according to formula 2;

$$Q=1-m\sqrt{A_q} \times \text{Expr} \times K \qquad \text{formula 2;}$$

where m is an expansion coefficient, $A_q$ is a significant movement area proportion of a previous normal frame of a video frame on which the distortion occurs, Expr is a scenario information weight, and K is a distortion coefficient.

11. A device for evaluating quality of a video in a time domain on a terminal side, comprising:
a calculating component, configured to calculate a significant movement area proportion of each video frame, wherein the significant movement area proportion refers to a proportion of an area on which a significant change occurs between two adjacent video frames to a video frame area;
a dividing component, configured to divide video frames into absolute regular frames and suspected distorted frames according to the significant movement area proportion of each video frame;
a detecting component, configured to perform a frozen frame detection, a scenario-conversion frame detection, a jitter frame detection, and a ghosting frame detection on the suspected distorted frames; and
an evaluating component, configured to split the video into scenarios according to a result of the scenario-conversion frame detection, calculate scenario information weight of each scenario, calculate a distortion coefficient according to a result of the frozen frame detection, a result of the jitter frame detection, and a result of the ghosting frame detection, and determine the quality of the video in the time domain on the terminal side according to the significant movement area proportion, the scenario information weight, and the distortion coefficient.

12. The device according to claim 11, wherein, the calculating component comprises:
a luminance matrix acquiring sub-component, configured to, according to a playing progress, decode a current $k^{th}$ video frame to a luminance chrominance YUV space to obtain a luminance matrix $Y_k$;
a setting sub-component, configured to, when it is determined that the current $k^{th}$ video frame is the first frame of the video, set a previous frame of the current $k^{th}$ video frame to be a frame of which pixel values are all zero, and invoke a filter sampling sub-component; when it is determined that the current $k^{th}$ video frame is not the first frame of the video, directly invoke the filter sampling sub-component;
the filter sampling sub-component, configured to perform Gaussian filtering on the luminance matrix $Y_k$ of the current $k^{th}$ video frame, and perform down-sampling on a filtering result;
a Gaussian image pyramid acquiring sub-component, configured to repeatedly invoke the Gaussian image pyramid acquiring sub-component n−1 times to obtain a Gaussian image pyramid $PMD_k$ containing n matrices with different scales, wherein a scale represents the number of times of Gaussian filtering and down-sampling operations that have been performed on a current matrix, and when the scale is 1, the current matrix is a source matrix $Y_k$, and n is a total number of the scales;
a Difference pyramid acquiring sub-component, configured to, for a Gaussian image pyramid $PMD_k$ of the current $k^{th}$ video frame and a $PMD_{k-1}$ of a $(k-1)^{th}$ video frame, calculate absolute value of difference of each element between matrices in scale s to obtain a difference matrix $M_{k,s}$, and constitute a difference pyramid $DPMD_k$ according to the difference matrix in each scale, wherein $M_{1,s}$ in the difference matrix $M_{k,s}$ is an all-zero matrix;
a Normalized difference matrix acquiring sub-component, configured to perform bilinear interpolation on the difference matrixes in all the scales except scale 1 in the $DPMD_k$, normalize a size of the difference matrix to be the same as a size of the source matrix $Y_k$, and average n difference matrices of the $DPMD_k$ including the source matrix $Y_k$ therein after interpolation to obtain a normalized difference matrix $Z_k$;
a Binary matrix acquiring sub-component, configured to perform median filtering and noise reduction on the $Z_k$ to obtain $Z_{km}$, and set a threshold θ, assign 1 to elements in the $Z_{km}$ which are greater than or equal to θ and assign 0 to elements in the $Z_{km}$ which are less than θ to obtain a binary matrix $BI_k$; and
a Significant movement area proportion acquiring sub-component, configured to sum the $BI_k$ and then divide the sum by a frame pixel area of the current $k^{th}$ video frame to obtain the significant movement area proportion of the current $k^{th}$ video frame.

13. The device according to claim 12, wherein the filter sampling sub-component is configured to perform Gaussian filtering on the luminance matrix $Y_k$ of the current $k^{th}$ frame with a frame window being 3×3, a mean value being 0 and a standard deviation being 0.5, and perform $\frac{1}{4}^a$ down-sampling on a filtering result, where a is a natural number.

14. The device according to claim 11, wherein the dividing component comprises:
a Suspected frozen frame determining sub-component, configured to, when a significant movement area proportion of a current $k^{th}$ video frame is 0, determine that the current $k^{th}$ video frame is a suspected frozen frame, where k>1;
a suspected scenario-conversion frame determining sub-component, configured to, when the significant movement area proportion of the current $k^{th}$ video frame is more than twice the significant movement area proportion of a previous video frame of the current $k^{th}$ video frame and is greater than a first predetermined threshold, and the previous video frame of the current $k^{th}$ video frame is a non-frozen frame, determine that the current $k^{th}$ video frame is a suspected scenario-conversion frame;
a Suspected jitter frame and suspected ghosting frame determining sub-component, configured to, when the significant movement area proportion of the current $k^{th}$ video frame is equal to a significant movement area proportion of a $(k+1)^{th}$ video frame, determine that the current $k^{th}$ video frame and the $(k+1)^{th}$ video frame are suspected jitter frames or suspected ghosting frames; and
an Absolute regular frame determining sub-component, configured to, when the significant movement area proportion of the current $k^{th}$ video frame does not conform to above various sub-components, and the previous video frame of the current $k^{th}$ video frame is the non-frozen frame, determine that the current $k^{th}$ video frame is the absolute regular frame.

15. The device according to claim 12, wherein the detecting component comprises: a frozen frame detecting component, wherein the frozen frame detecting component comprises:
a summing sub-component, configured to sum all elements in a difference matrix $M_{k,1}$ with the scale being 1, and when a summing result is 0, invoke a First judging sub-component; and when the summing result is not 0, determine that the current $k^{th}$ video frame is a normal frame and exit a entire distortion detection of the current $k^{th}$ video frame;
the First judging sub-component, configured to, when it is judged that a $(k-1)^{th}$ video frame is a frozen frame, determine that the current $k^{th}$ video frame is also the frozen frame and exit the entire distortion detection of the current $k^{th}$ video frame; when it is judged that the $(k-1)^{th}$ video frame is not the frozen frame, invoke a Screen frame judging sub-component;
the Screen frame judging sub-component, configured to, when it is judged that the $(k-1)^{th}$ video frame is a screen frame, determine that the current $k^{th}$ video frame is also the screen frame and exit the entire distortion detection of the current $k^{th}$ video frame; when it is judged that the $(k-1)^{th}$ video frame is not the screen frame, invoke a Calculating sub-component;
the Calculating sub-component, configured to calculate a space complexity $O_s$ and a colour complexity $O_c$ of the current $k^{th}$ video frame; and
a frozen frame and screen frame distinguishing sub-component, configured to calculate a screen coefficient $P=1-0.6O_s-0.4O_c+0.2b$ of the current $k^{th}$ video frame, when the P is greater than or equal to the second threshold, determine that the current $k^{th}$ video frame is the screen frame and is not the frozen frame; when the P is not greater than or equal to a second threshold, determine that the current $k^{th}$ video frame is the frozen frame, where b is a binary parameter, and when the $(k-1)^{th}$ video frame is a scenario-conversion frame or a significant movement area proportion of the $(k-1)^{th}$ video frame and a significant movement area proportion of a $(k-2)^{th}$ video frame are non-zero and equal, b=1; when the $(k-1)^{th}$ video frame is not the scenario-conversion frame and/or the significant movement area proportion of the $(k-1)^{th}$ video frame and the significant movement area proportion of the $(k-2)^{th}$ video frame are zero or not equal, b=0.

16. The device according to claim 12, wherein the detecting component comprises: a scenario-conversion frame detecting component, wherein the scenario-conversion frame detecting component comprises:
a Prospect matrix region dividing sub-component, configured to divide a prospect matrix region $BI_{k,f}$ from a middle region of a binary matrix $BI_k$ with a width being w and a height being h and determine other region of the $BI_k$ as a background region $BI_{k,b}$, and calculate a ratio $R_k$ of a sum of elements in the $BI_{k,b}$ of the $BI_k$ to a sum of elements in the $BI_{k,f}$ of the $BI_k$, wherein a height of the $BI_{k,f}$ is $[h/8+1]^{th}$ row to $[7h/8]^{th}$ row of the $BI_k$, and a width of the $BI_{k,f}$ is $[w/8+1]^{th}$ column to $[7w/8]^{th}$ column of the $BI_k$, a symbol "⌊⌋" refers to round down;
a Binary matrix dividing sub-component, configured to divide the region $BI_{k,b}$ into four parts by taking a $[h/2]^{th}$ row and a $[h/2]^{th}$ column of the $BI_k$ as a boundary, and respectively calculate proportion of the number of elements with value being 1 to the number of all elements in each of the four parts, and count the number $N_{i,v}$ of proportions which are greater than or equal to a third predetermined threshold in the four proportions; and a scenario-conversion frame judging sub-component, configured to, when $R_k$ is greater than a fourth predetermined threshold and $N_{i,v}$ is greater than a fifth predetermined threshold, determine that the current $k^{th}$ video frame is a scenario-conversion frame; when $R_k$ is not greater than or equal to the fourth predetermined threshold and/or $N_{i,v}$ is not greater than or equal to the fifth predetermined threshold, exit the scenario-conversion frame detection on the current $k^{th}$ video frame.

17. The device according to claim 11, wherein the detecting component comprises: a jitter frame and ghosting frame detecting component, wherein the jitter frame and ghosting frame detecting component comprises:
a First gradient frame determining sub-component, configured to, when a $(k-1)^{th}$ video frame is a gradient frame, determine that the current $k^{th}$ video frame is also the gradient frame, and exit a entire distortion detection of the current $k^{th}$ video frame; when the $(k-1)^{th}$ video frame is not the gradient frame, invoke a Second gradient frame determining sub-component;
the Second gradient frame determining sub-component, configured to, when a significant movement area proportion of a current $k^{th}$ video frame is equal to a significant movement area proportion of the $(k-1)^{th}$ video frame, determine that the current $k^{th}$ video frame is the gradient frame, and exit the entire distortion detection of the current $k^{th}$ video frame; when the significant movement area proportion of the current $k^{th}$ video frame is not equal to the significant movement area proportion of the $(k-1)^{th}$ video frame, invoke the a Jitter frame detecting sub-component;
the Jitter frame detecting sub-component, configured to calculate a differential matrix between a luminance matrix of the $(k-1)^{th}$ video frame and a luminance matrix of a $(k+1)^{th}$ video frame, take absolute values of all elements of the differential matrix and then sum all the elements; when a sum is 0, determine that the $(k+1)^{th}$ video frame is a jitter frame, and the $k^{th}$ video frame is a normal frame, and exit the entire distortion detection of the current $k^{th}$ video frame; when the sum is not 0, invoke a Ghosting frame detecting sub-component; and
the Ghosting frame detecting sub-component, configured to, when the significant movement area proportion of the current $k^{th}$ video frame is greater than or equal to the sixth predetermined threshold, determine that the current $k^{th}$ video frame is a ghosting frame, and the $(k+1)^{th}$ video frame is the normal frame; when the significant movement area proportion of the current $k^{th}$ video frame is not greater than or equal to a sixth predetermined threshold, determine that the $k^{th}$ video frame is the normal frame.

18. The device according to claim 11, wherein the evaluating component comprises:
a scenario information weight calculating sub-component, configured to split the video into scenarios according to the result of the scenario-conversion frame detection, when a current $k^{th}$ video frame is the first absolute regular frame after a closest scenario-conversion frame, sum a space complexity, a colour complexity, a luminance mean value and a significant movement area proportion of the current $k^{th}$ video frame to obtain a scenario information weight used for weighting the scenario.

19. The device according to claim 11, wherein the evaluating component comprises: a distortion coefficient Calculating sub-component, configured to calculate the distortion coefficient K according to formula 1;

$$K=0.07 \ln(44P_{frz}-41.28) \times F_{frz}+0.29F_{jit}+0.19F_{gst} \qquad \text{formula 1;}$$

where $F_{frz}$, $F_{jit}$ and $F_{gst}$ are respectively flag bits of a frozen frame, a jitter frame and a ghosting frame of a current frame, and one and only one of the three flag bits is 1, and other flag bits are all 0, 1 representing that there is a corresponding type of distortion in an evaluated video frame, and 0 representing that there is no corresponding type of distortion in the evaluated video frame; $P_{frz}$ is a freeze sustainability coefficient, and $P_{frz}=n \times \log_2(2+t)$ where n is the number of continuous frames accumulated in this freeze, and t is the number of times of freezes of which duration is longer than a second predetermined time at a single time within a first predetermined time before this freeze occurs, wherein the second predetermined time is less than the first determined time.

20. The device according to claim 11, wherein the evaluating component comprises: a Video quality determining sub-component, configured to calculate the quality Q of the video in the time domain on the terminal side according to formula 2;

$$Q=1-m\sqrt{A_q} \times \text{Expr} \times K \qquad \text{formula 2;}$$

where m is an expansion coefficient, $A_q$ is a significant movement area proportion of a previous normal frame of a video frame on which the distortion occurs, Expr is a scenario information weight, and K is a distortion coefficient.

* * * * *